(12) United States Patent
Backhaus et al.

(10) Patent No.: US 9,967,797 B2
(45) Date of Patent: *May 8, 2018

(54) SYSTEM AND METHOD FOR PROVISION OF A SECOND LINE SERVICE TO A TELECOMMUNICATIONS DEVICE USING MIXED RELATIONSHIP NUMBERS

(71) Applicants: George Backhaus, Suwanee, GA (US); Jignesh Gandhi, Duluth, GA (US); Julio Gonzalez, Tucker, GA (US); John Green, Roswell, GA (US); Philip Lowman, Elljay, GA (US); Paul Rubenstein, Johns Creek, GA (US); Mike Speanburg, Lawrenceville, GA (US)

(72) Inventors: George Backhaus, Suwanee, GA (US); Jignesh Gandhi, Duluth, GA (US); Julio Gonzalez, Tucker, GA (US); John Green, Roswell, GA (US); Philip Lowman, Elljay, GA (US); Paul Rubenstein, Johns Creek, GA (US); Mike Speanburg, Lawrenceville, GA (US)

(73) Assignee: Movius Interactive Corp, John Creek, GA (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/727,864

(22) Filed: Jun. 1, 2015

(65) Prior Publication Data

US 2015/0271731 A1 Sep. 24, 2015

Related U.S. Application Data

(63) Continuation-in-part of application No. 13/920,056, filed on Jun. 17, 2013, which is a continuation-in-part
(Continued)

(51) Int. Cl.
*H04W 4/16* (2009.01)
*H04W 12/02* (2009.01)
(Continued)

(52) U.S. Cl.
CPC ......... *H04W 40/02* (2013.01); *H04L 65/1046* (2013.01); *H04L 65/1069* (2013.01);
(Continued)

(58) Field of Classification Search
CPC ......... H04W 4/16; H04W 12/02; H04W 4/14; H04W 60/04; H04M 3/42255;
(Continued)

(56) References Cited

U.S. PATENT DOCUMENTS

| 8,229,471 B1* | 7/2012 | Kirkham | ............ H04W 8/28 455/456.1 |
| 8,379,818 B2* | 2/2013 | Arsenault | ......... H04M 3/42042 379/142.06 |

(Continued)

*Primary Examiner* — Khawar Iqbal
(74) *Attorney, Agent, or Firm* — Smith Tempel Blaha LLC; Gregory Scott Smith

(57) ABSTRACT

A method and system for the leveraging a reserved relationship number by an SLS platform and/or SLS phone module for the purpose of performing special operations other than making an SLS call available for termination at a subscriber TD and/or a third party TD involve associating the SLS phone number of the subscriber, the primary number of the subscriber and a next set of instructions via a common reserved relationship number.

2 Claims, 13 Drawing Sheets

Related U.S. Application Data of application No. 13/466,074, filed on May 7, 2012, application No. 14/727,864, filed on Jun. 1, 2015, which is a continuation-in-part of application No. 14/307,407, filed on Jun. 17, 2014, now Pat. No. 9,185,628, which is a continuation-in-part of application No. 12/133,996, filed on Jun. 5, 2008, now abandoned.

(60) Provisional application No. 61/660,772, filed on Jun. 17, 2012, provisional application No. 61/836,145, filed on Jun. 17, 2013.

(51) Int. Cl.
*H04W 60/04* (2009.01)
*H04W 40/02* (2009.01)
*H04W 8/02* (2009.01)
*H04L 29/06* (2006.01)
*H04M 3/42* (2006.01)

(52) U.S. Cl.
CPC ......... *H04M 3/42255* (2013.01); *H04W 4/16* (2013.01); *H04W 8/02* (2013.01)

(58) Field of Classification Search
CPC ......... H04M 3/42008; H04M 3/42229; H04M 15/8038; H04L 65/1046; H04L 65/1069
USPC .................. 455/411, 414.1–414.4, 417, 433
See application file for complete search history.

(56) References Cited

U.S. PATENT DOCUMENTS

| | | | | |
|---|---|---|---|---|
| 8,971,918 | B2* | 3/2015 | Kim | H04L 63/0414 455/414.1 |
| 9,338,305 | B2* | 5/2016 | Li | H04M 3/42195 |
| 2005/0277407 | A1* | 12/2005 | Ahn | H04W 8/26 455/414.1 |
| 2007/0105531 | A1* | 5/2007 | Schroeder, Jr. | H04M 3/42008 455/411 |
| 2009/0209236 | A1* | 8/2009 | Bloebaum | G06N 3/006 455/414.1 |
| 2010/0069046 | A1* | 3/2010 | Suginaka | H04M 3/42008 455/414.1 |
| 2010/0173605 | A1* | 7/2010 | Moraes | H04L 12/587 455/408 |
| 2011/0081009 | A1* | 4/2011 | Ma | H04M 15/06 379/142.04 |
| 2011/0184872 | A1* | 7/2011 | McNeill | G06Q 10/06 705/313 |
| 2012/0282903 | A1* | 11/2012 | Rabra | H04M 3/42272 455/414.1 |
| 2013/0003942 | A1* | 1/2013 | Bennett | H04M 3/42042 379/70 |
| 2013/0165086 | A1* | 6/2013 | Doulton | G06Q 10/107 455/414.4 |
| 2013/0254854 | A1* | 9/2013 | Moganti | H04L 63/20 726/5 |
| 2015/0133113 | A1* | 5/2015 | Vendrow | H04M 3/4234 455/426.1 |
| 2015/0172254 | A1* | 6/2015 | Edouard | H04L 63/0421 726/26 |
| 2015/0215459 | A1* | 7/2015 | Kirchhoff | H04M 3/436 379/266.07 |

* cited by examiner

| 315 Subscriber Relationship ID Table |||
|---|---|---|
| Subscriber Contact | Relationship Number | 3rd Party Number |
| 1 | +1.678.222.0001 | +1.305.229.9999 |
| 2 | +1.678.222.0002 | +1.212.777.8888 |
| 3 | +1.678.222.0003 | +1.408.333.2222 |
| 4 | +1.678.222.0004 | |
| 5 | +1.678.222.0005 | |
| ... | ... | |
| 9,999 | +1.678.222.9999 | |

Local SLS Database 106

FIG. 3B

325
Subscriber Special Relationship ID Table

| Association # | Reserved Relationship Number | Next Set of Instructions |
|---|---|---|
| 1 | +1.678.444.0001 | Include information in the call signal indicating that the caller is unknown |
| 2 | +1.678.444.0021 | Route the call directly to voicemail server |
| 3 | +1.678.444.0031 | Inform the TD that a voicemail is waiting |
| ... 9,999 | ... +1.678.444.9991 | _____ |

Local SLS Database 106

FIG. 3D

SYSTEM AND METHOD FOR PROVISION OF A SECOND LINE SERVICE TO A TELECOMMUNICATIONS DEVICE USING MIXED RELATIONSHIP NUMBERS

BACKGROUND

When a second line service ("SLS") provider offers a method for routing calls between an SLS subscriber's telecommunications device ("TD") and a third party's TD, the method may involve using a common relationship number associated to (1) the SLS number of the SLS subscriber, (2) the primary phone number (or any phone number from which the SLS subscriber can make/receive a call) and (3) the primary phone number of a third party (or any phone number from which the SLS subscriber can make/receive a call). In the typical SLS scenario, an SLS based call or communication is initiated from the TD of an SLS subscriber, and directed toward a particular third party or other final destination by the SLS subscriber entering or selecting the relationship number, directly or indirectly. These SLS based call or communications are routed to an SLS platform or server and then redirected by the SLS platform or server to a third party TD that is identified or associated with the relationship number. More specifically, the SLS leverages the relationship number such that the SLS call is routed to the SLS platform or server. At the SLS platform or server, the combination of the phone number associated with the subscriber TD used to initiate the SLS based call, and the relationship number identified in the SLS call, allows the SLS platform or server to identify the third party or the ultimate destination number. The SLS platform is then able to route the SLS based call to the third party number for call completion.

Despite the many benefits of a typical SLS, an SLS can provide additional value to the subscriber if it could do more than leverage relationship numbers for routing calls between an SLS subscriber's TD and a third party's TD. More specifically, an SLS could provide additional value to the subscriber if it could leverage a new and different type of relationship number for the purpose of performing special operations other than making an SLS call available for termination at a subscriber TD or a third party TD. Accordingly, what is needed is a system and method for this purpose.

SUMMARY OF THE DISCLOSURE

A method and system are described for the leveraging a reserved relationship number by an SLS platform and/or SLS phone module for the purpose of performing special operations other than making an SLS call available for termination at a subscriber TD and/or a third party TD.

In general, the operation of various embodiments of an SLS leveraging "Normal" relationship number are first described to provide an overall understanding of the SLS. Following this, the operation of various embodiments of an SLS leveraging reserved relationship numbers are presented.

An SLS system may operate in an environment in which an SLS platform is interposed between a network serving as the primary service provider to a subscriber's TD and a network serving as the primary service provider to a third party TD. As such, a call originating from a third party TD and directed towards the SLS number associated with the TD of an SLS subscriber, is routed by the receiving network to an SLS platform or server for processing.

Upon receiving the call, the SLS platform queries a local database to identify a relationship number that serves to map the primary number of the subscriber's TD to the combination of the third party calling number and the subscriber's second line number. The call is then redirected to the primary number of the subscriber's TD along with or in addition to, information that identifies the call as being directed to the SLS number. Once received by the subscriber's TD, the call setup is completed. Additional information may be included within the call signal such that an application running, associated with or resident on the subscriber's TD can save the combination in a local database on the subscriber's TD.

Advantageously, the relationship number so delivered to the subscriber's TD can be used at a later time to initiate an SLS based call to a third party. As a non-limiting example, dialing the third party's telephone number or otherwise initiating a call to the third party from the SLS application on the subscriber's TD can result in dialing or initiating a call to the relationship number for the third party. As such, when the call enters the telephone network (such as the PSTN, MTSO, etc.) the call is actually routed to the SLS platform. The SLS platform may then use the relationship number to identify the actual destination number of the third party and the SLS number that is attributed to being the originator of the call. Next, the SLS platform routes, bridges, transfers, initiates or otherwise establishes a completed communication path, or the delivery of a message from the originating TD to the destination TD. As a non-limiting example, using the actual third party called number, the SLS platform may complete the second leg of the call. In certain embodiments, a call leg between a subscriber's TD and the SLS platform may be completed using a session initiated protocol ("SIP") so that the data service provided by the primary service provider of the subscriber device is used in lieu of a voice channel.

However, if a subscriber TD attempts to direct an SLS based call to a third party number the does not have an associated relationship number, the call may be directed to, or invoke the routing of the call to the SLS platform by placing the call to a new relationship number selected by an SLS client application running on the subscriber's TD. In such case, the relationship number invokes the telecommunications network to route the call to the SLS platform and the third party number is provided to the SLS platform from the subscriber's TD. In other embodiments, the new relationship number may be requested from the SLS platform before making the call and then used by the subscriber's TD to make the call. In either case, a new relationship number is used to direct the call from the subscriber's TD toward the third party destination and to trigger the telecommunications network to route the call to the SLS platform.

In the databases located at or accessible to the subscriber's TD and the SLS platform, the new relationship number maps the subscriber's primary number to the combination of the third party number and the subscriber's second line number. The call is redirected by the SLS platform to the number associated with the third party TD and the call is completed. Advantageously, the new relationship number can be used at a later time should the subscriber desire to call the third party as previously described.

By associating the SLS phone number of the subscriber, the primary number of the subscriber and the phone number of a third party via a common relationship number, SLS based calls can be directed to and from an SLS of a subscriber TD.

Understanding the general operation of the SLS, an SLS leveraging reserved relationship numbers can now be better understood. In general, this aspect of the various embodiments utilizes a different type of relationship number than has been previously presented. With regard to "Normal" relationship numbers, the translation of the specific information, e.g., which SLS phone number is calling and to which third party telephone number the second leg of the SLS should be directed by the SLS platform requires two pieces of information from the call signal: the actual primary number associated with the subscriber TD and the relationship number. The result of this is the ability for an SLS platform and/or an SLS phone module to leverage a reserved relationship number for the purpose of making an SLS call available for termination at a subscriber TD and/or a third party TD With regard to reserved relationship numbers, the SLS platform and/or an SLS phone module may leverage reserved relationship numbers for purposes other than making the call available for termination at subscriber TD 110 through its SLS. As a non-limiting example, sometimes the call from the third party TD is received at the SLS platform and a query of a central SLS database determines that the call was meant for the second line number associated with subscriber TD; however, the SLS platform may not be able to terminate the call at subscriber TD through its SLS because the subscriber does not answer the call, because the subscriber TD drops the call, etc. Despite these circumstances, the SLS platform may leverage reserved relationship numbers stored in central SLS database 116 to alert the SLS Module that a voice message has been deposited for the subscriber.

In another non-limiting embodiment, receiving a call through an SLS from a third party TD when the call signal does not include the CLID or any other data useful for identification of the phone number being used by and associated with the calling TD also involves leveraging a reserved relationship number. In this embodiment, the telecommunications network routes the call based on the called number (the SLS phone number associated with the SLS subscriber). Ultimately, the telecommunications network routes the call to SLS platform. Once the call reaches the SLS platform, it cannot make a translation of the "Normal" relationship number as described above because the call signal is missing necessary information. Despite this set back, the SLS platform may maintain a database of reserved relationship numbers for each SLS subscriber. These reserved relationship numbers may be used to make a call between the subscriber TD and the SLS platform like the "Normal" relationship number; however, leveraging the reserved relationship number allows the SLS to perform special operations. For example, leveraging the reserved relationship number may allow the SLS to include information in the call signal indicating that the caller is unknown. In other non-limiting embodiments, leveraging the reserved relationship number may allow the SLS to route the call directly to voicemail server or inform the TD that a voicemail is waiting, etc.

Notably, it is envisioned by this disclosure that the "next set of instructions" associated with a reserved relationship number can be a one step set of instructions or it could be a complex multistep set of instructions. Additionally, it is envisioned by this disclosure that the same reserved relationship number can be associated with a different "next set of instructions" depending on whether a call to that reserved relationship number is from the SLS platform to the subscriber TD or from the subscribed TD to the SLS platform; the association may be different if instead of a call, an SMS is directed to or from the reserved relationship number, etc. Although all these possibilities are not described in detail within this disclosure, this should not limit the scope of the disclosure.

BRIEF DESCRIPTION OF THE DRAWINGS

In the Figures, like reference numerals refer to like parts throughout the various views unless otherwise indicated. For reference numerals with letter character designations such as "102A" or "102B", the letter character designations may differentiate two like parts or elements present in the same figure. Letter character designations for reference numerals may be omitted when it is intended that a reference numeral encompass all parts having the same reference numeral in all figures.

FIGS. 3A-3B illustrate exemplary data tables that may be leveraged by a redirection module of an SLS platform and an SLS module of a subscriber TD to provide a second line service to a user of subscriber TD.

FIGS. 3C-3D illustrate exemplary data tables that may be leveraged by a redirection module 117 of an SLS platform 115 and an SLS module of a subscriber TD to provide a second line service to a user of subscriber TD and allow the SLS to perform special operations FIGS. 4A-4E collectively illustrate an exemplary method for implementing an SLS call between a third party TD and a TD associated with an SLS subscriber using reserved relationship numbers.

DETAILED DESCRIPTION

Figure 1:
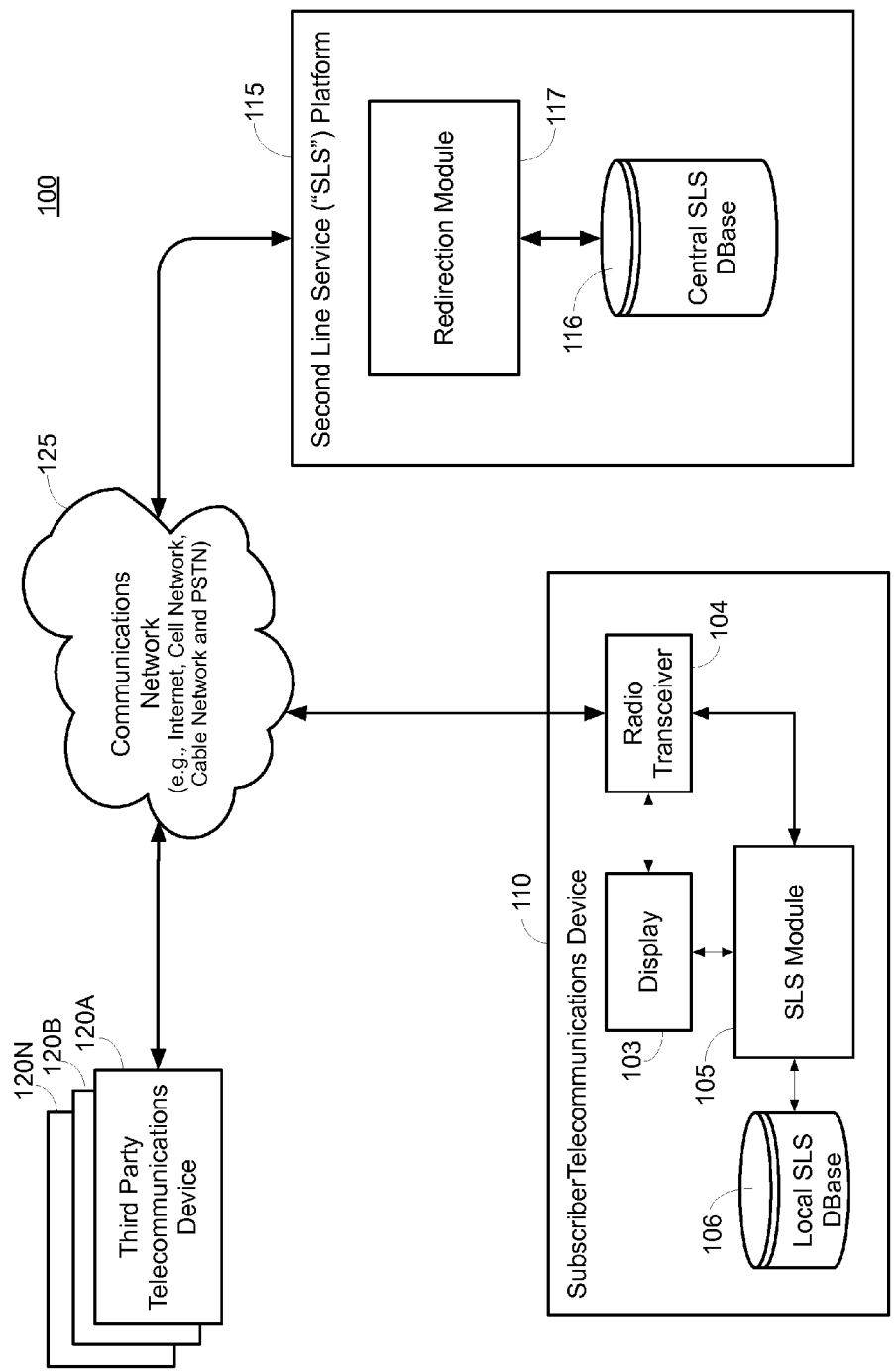
FIG. 1 is a high level diagram illustrating exemplary components of a system for providing an SLS to a subscriber TD.

The word "exemplary" is used herein to mean "serving as an example, instance, or illustration." Any aspect described herein as "exemplary" is not necessarily to be construed as preferred or advantageous over other aspects.

In this description, the terms "application" and "app" may also include files having executable content, such as: object code, scripts, byte code, markup language files, and patches. In addition, an "application" referred to herein, may also include files that are not executable in nature, such as documents that may need to be opened or other data files that need to be accessed. Further, an "application" may be a complete program, a module, a routine, a library function, a driver, etc.

The term "content" may also include files having executable content, such as: object code, scripts, byte code, markup language files, and patches. In addition, "content" referred to herein, may also include files that are not executable in nature, such as documents that may need to be opened or other data files that need to be accessed.

As used in this description, the terms "component," "database," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device may be a component.

One or more components may reside within a process and/or thread of execution, and a component may be localized on one computer and/or distributed between two or more computers. In addition, these components may execute from various computer readable media having various data structures stored thereon. The components may communicate by way of local and/or remote processes such as in accordance with a signal having one or more data packets, e.g., data from one component interacting with another component in a local system, distributed system, and/or across a network such as the Internet with other systems by way of the signal).

In this description, the terms "telecommunications device," "communication device," "wireless device," "wireless telephone," "wireless communication device" and "wireless handset" are used interchangeably. With the advent of third generation ("3G") and fourth generation ("4G") wireless technology, greater bandwidth availability has enabled more portable computing devices with a greater variety of wireless capabilities. Therefore, a telecommunications device ("TD") may include a cellular telephone, a pager, a PDA, a smartphone, a navigation device, a tablet personal computer ("PC"), or a hand-held computer with a wireless connection or link.

In this description, the terms "call" and "communication," in their noun forms, envision any data transmission routed across a network from one device to another including, but not limited to, a voice transmission, a text message, a video message, a page, a data transmission, etc.

FIG. 1 is a high level diagram illustrating exemplary components of a system 100 for providing an SLS to a subscriber TD 110. In general, an SLS based call can be originated by a subscriber TD 110 and directed toward a non-subscriber or subscriber third party TD 120 or be originated by a non-subscriber or a subscriber third party TD 120 and directed towards a subscriber TD 110. The typical subscriber TD 110 is associated with a primary phone number assigned to it and provisioned and serviced by the subscriber's home mobile service provider ("primary service provider") as is understood by one of ordinary skill in the art. A subscriber to an SLS offered through exemplary system 100 may receive calls at the subscriber TD 110 that are originally directed to either of the primary phone number provided by the primary service provider or the secondary phone number ("SLS phone number") provided, serviced and or facilitated by the SLS platform 115. It will also be appreciated that in some embodiments, the subscriber TD 110 may only include SLS operation and not include a primary number at all. In such embodiments, any communication between the TD 110 and the servicing network would occur over a data channel rather than a voice channel. In such embodiments, the TD 110 could actually be a computer device connected to the Internet. Yet in other embodiments, the TD 110 may include a minimalized primary number service that is greatly restricted. For instance, minimal mobile service only includes the ability to make a 911 emergency call. In some embodiments, one step above such limitation may be provided to the TD 110 such that the TD 110 can only operate to exchange sufficient information with the network to establish an SLS call.

Notably, depending on the particular embodiment, the primary service provider and the SLS platform, i.e., the second line service provider, may be the same provider or different providers. In embodiments where the primary service provider and the second line service provider are different providers, the SLS subscriber may receive separate billing records from each provider. However, it is envisioned that certain embodiments where the primary service provider and the second line service provider are not one and the same may take advantage of session initiated protocols ("SIP") to simplify billing records for the user.

In general, any call directed to either of the primary phone number or the SLS phone number are transmitted from a third party TD 120 to the subscriber TD 110 by way of communications network 125. Notably, communications network 125 envisions any and all networks for transmitting and terminating communications between TDs such as, but not limited to, cellular networks, PSTNs, cable networks and the Internet. Methods for effecting the transmission of data across communications network 125 from one device to another, including call setups, terminations and the like are understood by those of ordinary skill in the art of data transmission and may include the use of protocols and standards such as, but not limited to, signaling system seven ("SS7") protocol suite, SIP, customized applications for mobile networks enhanced logic ("CAMEL") or CAMEL Application Part ("CAP"), remote operations service element ("ROSE"), Voice Over IP ("VOIP"), etc. Notably, while the use of any particular protocol or communications standard may be a novel aspect of a particular embodiment of the systems and methods, it will be understood that the scope of the systems and methods disclosed herein is not limited to the use of any particular protocol or combination of protocols.

A call made from a third party TD 120 to the primary number associated with subscriber TD 110 is transmitted across communications network 125 and routed to subscriber TD 110, as is understood in the art. The radio transceiver 104, if the TD 110 is a portable and wireless device, enables the receipt and transmission of signals to and from subscriber TD 110. The call signal may include the calling line identification ("CLID"), i.e., the phone number being used by and associated with third party TD 120 for the call, such that when the call is received at subscriber TD 110 the CLID may be displayed for the benefit of the SLS subscriber on display component 103.

Notably, although the exemplary embodiments described in the present disclosure use the CLID as an example of data that may be displayed for the benefit of the user of a subscriber TD 110, it will be understood that any data associated with the third party TD 120, subscriber TD 110, SLS platform 115 or the like may be rendered for the benefit of the user of the system 100 and, as such, only describing that the CLID is displayed will not limit the scope of what is envisioned by the disclosure. Moreover, it is envisioned that any data uniquely associated with a call to a primary number or an SLS phone number may be displayed for the benefit of a SLS subscriber to the system 100.

Returning to the FIG. 1 illustration, a call made from a third party TD 120 to an SLS phone number associated with subscriber TD 110 is transmitted across communications network 125. As one of ordinary skill in the art will understand, the communications network 125 routes the call based on the dialed SLS phone number and routes the call to SLS platform 115. This is the first leg of the SLS. SLS platform 115 thus effectively intercepts the call, determines that the call was intended for subscriber TD 110 and then takes actions such that the call can be terminated at the subscriber TD 110. This is the second leg of the SLS. In this way, while a call directed to a primary number associated with subscriber TD 110 is routed directly to subscriber TD 110, a call directed to a second line number associated with subscriber TD 110 is route to SLS platform 115 instead.

Once the call is received at SLS platform 115, a query of central SLS database 116 by redirection module 117 determines that the call from third party TD 120 was meant for the second line number associated with subscriber TD 110. Once the determination is made, redirection module 117 processes the call and performs additional network functions such that the call is made available for termination at subscriber TD 110 through its SLS.

Because the call may include data identifying it as a call to the SLS phone number associated with subscriber TD 110, SLS module 105 intercepts the incoming call, or otherwise injects itself into the call processing activity for the call, and then leverages data stored in local SLS database 106 to render it in such a way that subscriber TD 110 processes the call as an SLS call as opposed to a call directed at its primary phone number. The SLS module 105 is designed to work with radio transceiver 104 and any stored or retrievable content in local SLS database 106 to terminate a call to a SLS phone number, render associated data and provide services uniquely associated with the SLS phone number such as, but not limited to, dedicated voicemail, ringtones, caller ID, automated responses, etc.

Notably, it is envisioned by this disclosure that the SLS platform 115 may leverage data stored in central SLS database 116 for purposes other than making the call available for termination at subscriber TD 110 through its SLS. As a non-limiting example, sometimes the call from third party TD 120 is received at SLS platform 115 and a query of central SLS database 116 determines that the call was meant for the second line number associated with subscriber TD 110; however, SLS platform 115 may not be able to terminate the call at subscriber TD 110 through its SLS because the subscriber does not answer the call, because the subscriber TD 110 drops the call, etc. Despite these circumstances, the SLS platform 115 may leverage data stored in central SLS database 116 to alert the SLS Module 105 that a voice message has been deposited for the subscriber.

A more detailed description of the exemplary method will be described below relative to FIGS. 4-5, including exemplary methods for receiving a call from a third party TD 120 and making a call by way of the SLS platform 115, and leveraging data stored in local SLS database 106 and/or central SLS database 116 for purposes other than making an SLS call available for termination at subscriber TD 110 or third party TD 120.

Figure 2:
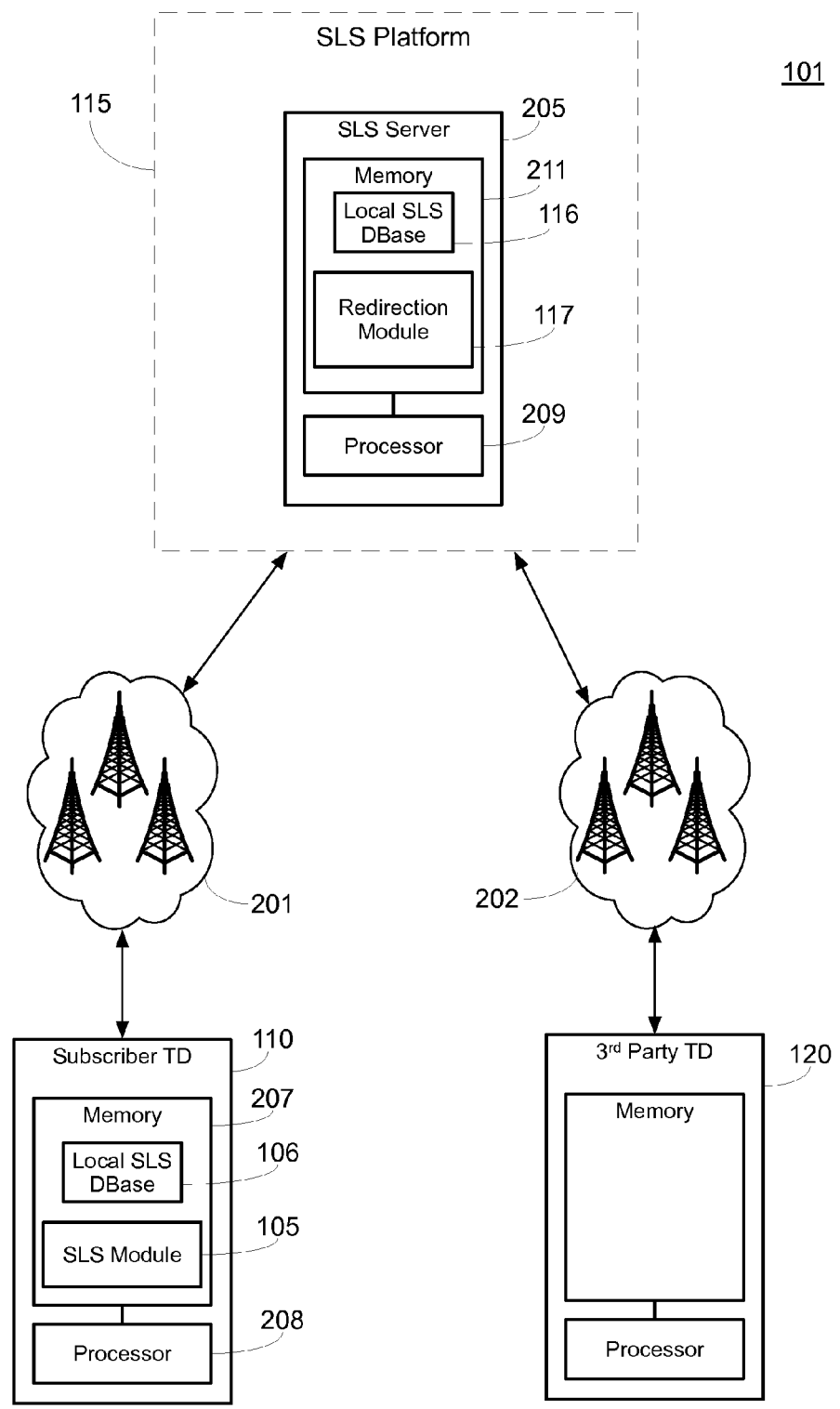
FIG. 2 is a diagram of an exemplary network architecture for the system of FIG. 1.

FIG. 2 depicts a diagram of exemplary network architecture 101 for the system 100 of FIG. 1. The exemplary network architecture 101 may include a subscriber TD 110 and a third party TD 120. Notably, although the third party TD 120 is not illustrated to suggest that it is equipped with SLS capability, it is envisioned that in some embodiments both the subscriber TD 110 and the third party TD 120 may be SLS enabled.

As shown in the FIG. 2 illustration, an SLS platform 115 may be connected to the subscriber TD 110 via a first provider network 201 and to the third party TD 120 via a second provider network 202, although it is envisioned that TDs 110 and 120 may be associated with a common service provider. One of ordinary skill in the art would recognize that communications network 125 from FIG. 1 can be comprised of smaller networks like first provider network 201 and second provider network 202.

It is envisioned that the first provider network 201 and the second provider network 202 can be the same network. Additionally, it is envisioned that the first provider network 201 and the second provider network can be operated, serviced, owned, etc. by the same or different service provider(s), and it is envisioned that either, or both, service providers respectively associated with provider networks 201 or 202 may function as both a primary service provider and/or an SLS provider for a given subscriber TD 110 or third party TD 120. Furthermore, it is envisioned that either or both of subscriber TD 110 and third party TD 120 may be associated with a primary service provider and a separate SLS provider.

Notably, depending on the particular embodiment, if subscriber TDs 110 is situated outside of the locality serviced by its primary service provider network then the first provider network 201 may be a secondary service provider network that is servicing the new locality. The same is true for third party TD 120. Both of these "traveling" or "roaming" circumstances, and their associated systems and methods within the network telecommunications architecture, are understood by those of ordinary skill in the art.

For exemplary purposes, the subscriber TD 110 is depicted as being SLS enabled and the third party TD 120 is depicted as not having a second line service associated with it. Moreover, first provider network 201 and the second provider network 202 are the same network in FIG. 2. Finally, first provider network 201 and the second provider network 202 are depicted as networks that, at certain times and under certain circumstances, may not make the CLID, or other data useful for identification of the phone number being used by and associated with the calling TD, available, reliably available, consistently available, etc. Despite what is depicted for exemplary purposes, other combinations of primary and secondary service provider networks connecting SLS platform 115 to subscriber TD 110 and third party TD 120 are envisioned.

In the FIG. 2 illustration, it can be seen that the SLS platform 115 may include an SLS server 205 configured to receive calls directed to and from an SLS phone number associated with subscriber TD 110. The SLS server 205 includes a processor 209 and a memory 211 coupled to the processor 209. The memory 211 may include instructions for executing one or more of the method steps described herein. Further, the processor 209 and the memory 211 may serve as a means for executing one or more of the method steps described herein. As indicated, the memory 211 may also include a redirection module 117 and a central SLS database 116. Notably, it should be understood that the term server 205 may refer to a single server system or multiple systems or multiple servers. One of ordinary skill in the art will appreciate that the various server arrangements may be selected depending upon computer architecture design constraints and without departing from the scope of the invention.

As further illustrated in FIG. 2, the subscriber TD 110 may include a processor 208 and a memory 207 coupled to the processor 208. The memory 207 may include instructions for executing one or more of the method steps described herein. Further, the processor 208 and the memory 207 may serve as a means for executing one or more of the method steps described herein. As indicated, the memory 207 may also include an SLS module 105 and a local SLS database 106.

Illustrative embodiment of methods for providing an SLS to an SLS subscriber will now be described in the context of the system and network architecture described in FIGS. 1-2 and the exemplary data tables reflected in FIGS. 3A-3D. Specifically, three different embodiments will be described: one embodiment describes receiving a call through an SLS from a third party TD 120 when the call signal does not include the CLID or any other data useful for identification of the phone number being used by and associated with the calling TD; the second and third embodiment describes leveraging data stored in local SLS database 106 and/or central SLS database 116 for purposes other than making an SLS call available for termination at subscriber TD 110 or third party TD 120.

With regard to the first embodiment, as previously stated, FIG. 1 illustrates a call made from a third party TD 120 to an SLS phone number associated with subscriber TD 110. As one of ordinary skill in the art will recall, the communications network 125 routes the call based on the called number (the SLS phone number associated with the SLS subscriber). Ultimately, communications network 125 routes the call to SLS platform 115. SLS platform 115 effectively intercepts the call, determines that the call was intended for subscriber TD 110 and then takes actions using "relationship numbers" such that the call can be terminated at the subscriber TD 110. Consequently, the first illustrative embodiment of the method involves leveraging two sets of intermediate phone numbers, one set of intermediate phone numbers for one leg of the SLS and the other for the second leg of the SLS, such that calls directed to subscriber TD 110 ultimately terminate at TD 110 using the SLS.

Figure 3A:
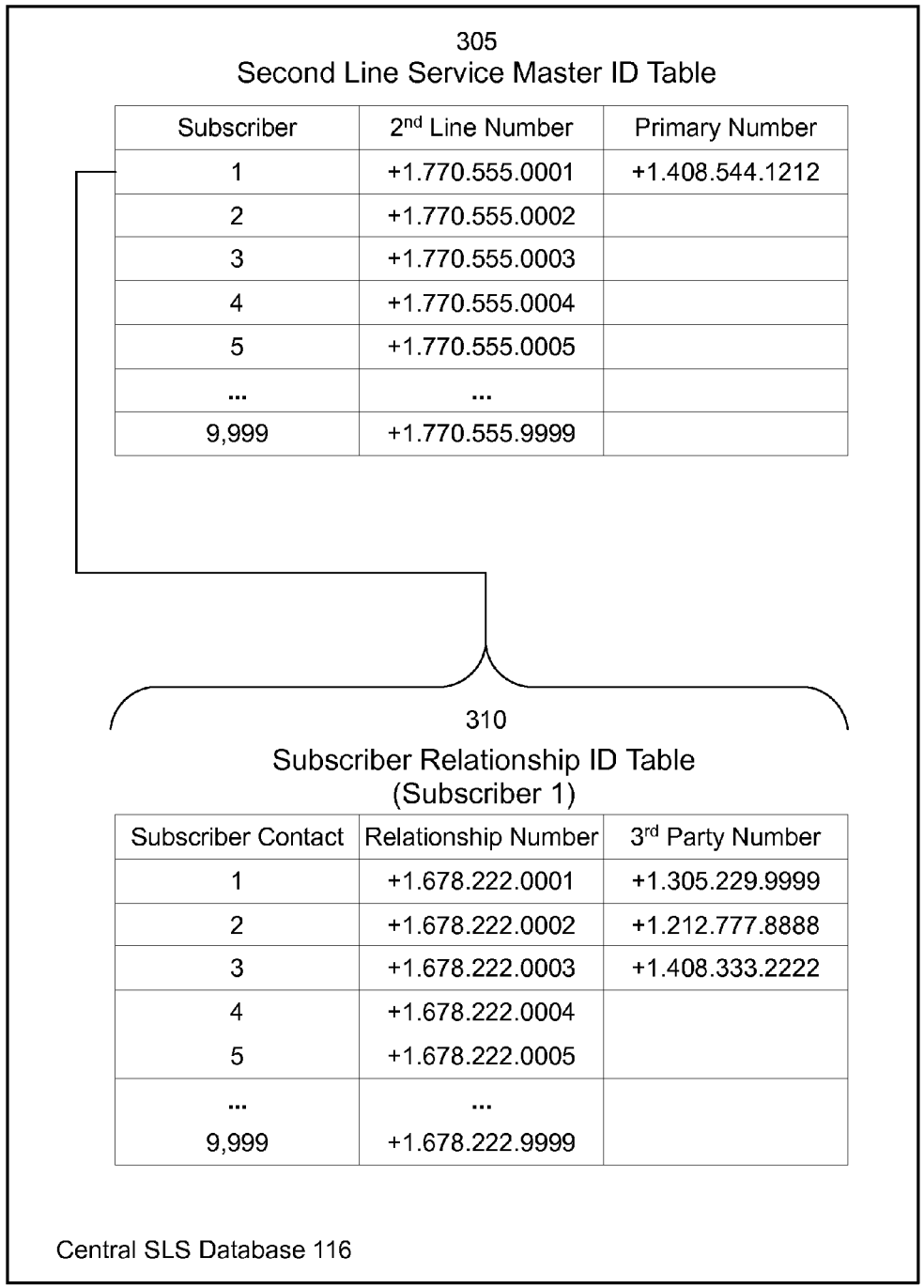
Figure 3C:
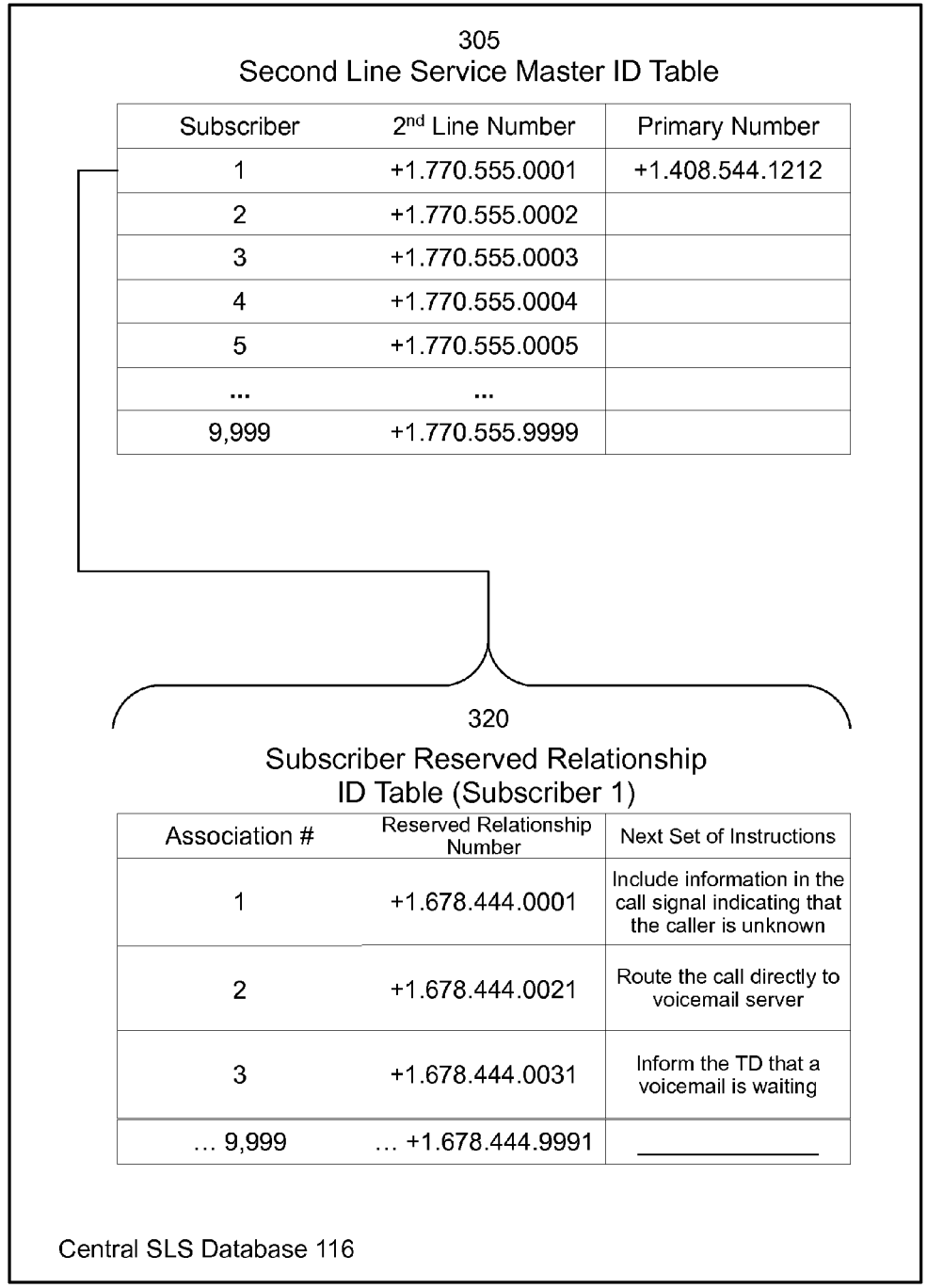

FIGS. 3A-3B illustrate an exemplary data tables that may be leveraged by a redirection module 117 of an SLS platform 115 and an SLS module 105 of a subscriber TD 110 to provide a second line service to a user of subscriber TD 110. Referring to FIGS. 3C-3D, illustrated are exemplary data tables that may be leveraged by a redirection module 117 of an SLS platform 115 and an SLS module 105 of a subscriber TD 110 to provide a second line service to a user of subscriber TD 110 and allow the SLS to perform special operations. The Second Line Service Master ID Table 305 and Subscriber Relationship ID Table 310 of FIG. 3A are stored in a central SLS database 116 while the exemplary Subscriber Relationship ID Table 315 of FIG. 3B are stored in a local SLS database 106. Likewise, the Second Line Service Master ID Table 305 and Subscriber Reserved Relationship ID Table 320 of FIG. 3C are stored in a central SLS database 116 while the exemplary Subscriber Reserved Relationship ID Table 325 of FIG. 3D are stored in a local SLS database 106. As such, some illustrative embodiments involve leveraging two sets of intermediate phone numbers, the phone numbers related to the Second Line Service Master ID Table 305 and the phone numbers related to the Subscriber Relationship ID Tables. Other illustrative embodiments involve leveraging two sets of intermediate phone numbers, the phone numbers related to the Second Line Service Master ID Table 305 and the phone numbers related to the Subscriber Reserved Relationship ID Tables. Notably, it is envisioned that in some illustrative embodiments three sets of intermediate phone numbers may be involved even though only two sets of intermediate phone numbers are actually leveraged for the first and second leg of the SLS. Finally, it is envisioned that in some illustrative embodiments only one set of intermediate phone numbers may be involved, specifically the phone numbers related to the Subscriber Reserved Relationship ID Tables.

With regard to the first embodiment and to the leveraging of the first set of intermediate phone numbers, specifically the phone numbers related to the Second Line Service Master ID Table 305, once the call reaches the SLS platform 115, an application running on redirection module 117 makes a translation to complete this first leg of the SLS. The SLS platform 115 maintains a master list of SLS phone numbers that are in service. In some embodiments, the SLS provider may be the owner, lessee, or assignee, etc. of these SLS phone numbers.

In the communications network 125, these SLS phone numbers route to the SLS platform 115, i.e., the SLS platform may be communicatively coupled with communications network 125, and any of its component networks like first provider network 201 or second provider network 202, such that a call directed at the SLS phone number is ultimately routed to the SLS platform. However, one of ordinary skill in the art will recognize that, depending on which provider network the SLS phone number is associated, a call directed at/directed from the SLS phone number is usually routed through its associated provider network before terminating at the SLS platform. For example, in FIG. 2, if the SLS phone number is associated with first provider network 201, then any call direct at/directed from the SLS phone number is routed through first provider network 201 regardless of the SLS phone number being owned, lease, or assigned, etc. by a separate SLS provider.

The SLS provider that manages the SLS platform 115 essentially has a group of SLS phone numbers in inventory, and the SLS provider assigns the SLS phone numbers to subscribers of the SLS. Regarding the SLS provider's inventory of SLS phone numbers, one of ordinary skill in the art will recognize that the SLS phone numbers may be random and generally unrelated to each other, i.e., although the exemplary SLS phone numbers depicted in the FIG. 3A Second Line Service Master ID Table are sequential, it is envisioned that such is not the case in all embodiments.

Moreover, one of ordinary skill in the art will recognize that, although the exemplary SLS phone numbers depicted in the FIG. 3A Second Line Service Master ID Table 305 include a specific country code, area code, and seven digit directory number, it is envisioned that any country code, area code and directory number system known to those skilled in the art is included within the scope of this disclosure. Additionally, it is envisioned that the SLS provider can maintain a large and diverse inventory of SLS phone numbers; each being associated with its respective provider network and, consequently, each routing through its associated provider network before terminating at the SLS platform 115.

Referring back to FIG. 3A, the Second Line Service Master ID Table 305, the example Subscriber #1 has been issued SLS phone number 1.770.555.0001. Other SLS subscribers in different situations and with different circumstances are within the scope of this disclosure. As such, Subscriber #1 may choose to give out its SLS phone number to any of its contacts.

With regard to the first embodiment and to the leveraging of the second set of intermediate phone numbers, specifically the phone numbers related to the Subscriber Reserved Relationship ID Tables of FIGS. 3C-3D, for each SLS subscriber a Subscriber Reserved Relationship ID Table 320 is also maintained. Referring to the Subscriber Relationship ID Table 320, the SLS provider has another list of dialable phone numbers, i.e., reserved relationship numbers, which are maintained. These reserved relationship numbers are essentially "hidden numbers" that are used to make the second leg of the call between the subscriber TD 110 and the SLS platform 115.

In some embodiments, the SLS provider may be the owner, lessee, or assignee, etc. of these reserved relationship numbers. Like the SLS phone numbers, one of ordinary skill in the art will recognize that, depending on which provider network the reserved relationship numbers are associated, a call direct at/directed from the reserved relationship numbers are usually also routed through their associated provider network. For example, in FIG. 2, if the reserved relationship numbers are associated with first provider network 201/ second provider network 202, then any call direct at/directed from the relationship numbers is routed through first provider network 201/second provider network 202 regardless of the relationship number being owned, lease, or assigned, etc. by an SLS provider.

Concerning the Subscriber Reserved Relationship ID Table 320, one of ordinary skill in the art will understand that certain embodiments may not formally distinguish one SLS subscriber's records from that of another via individual subscriber reserved relationship ID tables. Rather, as is understood in the art of database management and query, a more general relational database including records associated with multiple SLS subscribers may be used to map SLS subscriber number and the "next set of instructions" to a given reserved relationship numbers. As such, it will be understood by one of ordinary skill in the art that the description in this disclosure of exemplary embodiments that include individual subscriber reserved relationship ID tables are offered for illustrative purposes only and will not limit the scope of the disclosure.

Additionally, concerning the use of reserved relationship numbers, it is envisioned that certain reserved relationship numbers may be used for a plurality of SLS phone number and the "next set of instructions" combinations, i.e., in certain embodiments a given reserved relationship number may not be unique to a given subscriber phone number and the "next set of instructions" combination. For example, in an illustrative non-limiting embodiment, SLS subscribers D, E, F and G, may all have database records that map reserved relationship number X to the "next set of instructions" such as (J) "include information in the call signal indicating that the caller is unknown", (K) "include information in the call signal instructing the call to be immediately dropped", (L) "route the call immediately to voicemail" and (E) "inform the TD that a voicemail is waiting", respectively. Notably, in this exemplary scenario, the subscriber phone number and the "next set of instructions" combination G:E is meant to envision a case where G is associated with reserved relationship number such that G's TD can be informed that a voicemail is waiting on the SLS platform.

Like the SLS phone numbers, the SLS provider essentially has a group of reserved relationship numbers in inventory, and the SLS provider assigns the reserved relationship numbers as described above, and as described in greater detail below. Regarding the SLS provider's inventory of reserved relationship numbers, one of ordinary skill in the art will recognize that the reserved relationship numbers may be random and generally unrelated to each other, i.e., although the exemplary reserved relationship numbers depicted in the FIGS. 3C-3D Subscriber Reserved Relationship ID Tables are sequential, it is envisioned that such is not the case in all embodiments.

Moreover, one of ordinary skill in the art will recognize that, although the exemplary reserved relationship numbers depicted in the FIGS. 3C-3D Subscriber Reserved Relationship ID Tables include a specific country code, area code, and seven digit directory number, it is envisioned that any country code, area code and directory number system known to those skilled in the art is included within the scope of this disclosure. Additionally, it is envisioned that the SLS provider can maintain a large and diverse inventory of reserved relationship numbers; each being associated with its respective provider network and, consequently, each routing through its associated provider network when leveraged by the SLS.

Referring again to FIGS. 3C-3D and the Subscriber Reserved Relationship ID Tables, the example "next set of instructions" (1) "include information in the call signal indicating that the caller is unknown", (2) "route the call directly to voicemail server" and (3) "inform the TD that a voicemail is waiting" have been associated with reserved relationship numbers 1.678.444.0001, 1.678.444.0021 and 1.678.444.0031 respectively. Other "next set of instructions" are within the scope of this disclosure. Notably, it is envisioned by this disclosure that the "next set of instructions" associated with a reserved relationship number can be a one step set of instructions or it could be a complex multistep set of instructions. The fact that three specific embodiments of "next set of instructions" are described in this disclosure should not be interpreted to limit the scope of the instructions that can be associated with a reserved relationship number. Additionally, it is envisioned by this disclosure that the same reserved relationship number can be associated with a different "next set of instructions" depending on whether a call to that reserved relationship number is from the SLS platform to the subscriber TD or from the subscribed TD to the SLS platform; the association may be different if instead of a call, an SMS is directed to or from the reserved relationship number, etc. Although all these possibilities are not described in detail within this disclosure, this should not limit the scope of the disclosure.

As mentioned above, the reserved relationship numbers are "behind the scenes" numbers that are hidden from the SLS subscriber and any third party calling the SLS subscriber through the SLS. This is accomplished by an app running on SLS module 105 residing on subscriber TD 110. In the illustrative embodiment, SLS platform 115 has effectively intercepted the first leg of the SLS and determined that the call was intended for subscriber TD 110 (this was described above). However, because the call signal does not include the CLID or any other data useful for identification of the phone number being used by and associated with third party TD 120, SLS platform 115 is unable to map/query a relationship number (as distinct from the reserved relationship number) for the SLS number and the third party phone number. As will be described in greater detail below, SLS platform 115 takes an action that involves the reserved relationship number such that the call can be terminated at the subscriber TD 110. Essentially, by leveraging the reserved relationship number, an SLS provider may continue to insert itself into the middle of a call between a third party TD 120 and a subscriber TD 110.

Returning to the FIGS. 3C-3D and the illustrative embodiment, Subscriber #1 associated with subscriber TD 110 already has mobile phone service via its primary service provider using mobile phone number 1.408.544.1212. Subscriber #1 subscribes to an SLS provided by way of SLS platform 115 and is assigned SLS phone number 1.770.555.0001. The third party uses TD 120 to place a call to the Subscriber #1's SLS phone number 1.770.555.0001. As described above, the call is routed to the SLS platform 115. The SLS platform 115 accepts the call and determines that the call is for SLS phone number 1.770.555.0001, but because the call signal does not include the CLID or any other data useful for identification of the phone number being used by and associated with third party TD 120, SLS platform 115 is unable to map/query a relationship number (as distinct from the reserved relationship number) for the SLS number and the third party phone number.

Consequently, the SLS platform 115 queries the reserved relationship number in Subscriber Reserved Relationship ID Table 320 such that when 1.770.555.0001 receives a call from an unknown third party phone number, the interaction with the subscriber TD 110 (having primary phone number 1.408.544.1212) will use dialable reserved relationship number 1.678.444.0001. This reserved relationship number was selected because the call signal does not include the CLID or any other data useful for identification of the phone number being used by and associated with third party TD 120 and, as a result, because SLS platform 115 is unable to map/query a relationship number using Subscriber Relationship ID Table 310. Notably, it is envisioned that a given reserved relationship number, such as reserved relationship number 1.678.444.0001 in the present example, may be used as a reserved relationship number for many different SLS subscribers. Moreover, it is envisioned that there can be an entire range of reserved relationship number, e.g., reserved relationship number 1.678.444.0001-1.678.444.0010, that are associated with the same "next set of instructions."

Now that the reserved relationship number 1.678.444.0001 has been selected, the SLS platform 115 may proceed to establish the second leg of the SLS—the call from the SLS platform 115 to the subscriber TD 110. The SLS platform 115 places the call to the subscriber TD 110. It is known to those with ordinary skill in the art that methods for establishing this second leg of the SLS include the use of protocols and standards such as, but not limited to, SS7 protocol suite, SIP, CAMEL or CAP, ROSE, VOIP, etc. It is of course possible for the SLS platform 115 to direct the call to the primary number 1.408.544.1212 of the subscriber TD 110 using standard voice channels.

Returning to the illustrative embodiment, the CLID field for the call placed from SLS platform 115 to subscriber TD 110 may contain a specially encoded message for the SLS phone app running on SLS module 105. In some embodiments, this CLID field may contain the relationship number established by the SLS platform 115 (in this example, 1.678.444.0001) and a message (in this example, "unknown caller"), separated by a dialable separator such as a "star" character. In other embodiments, this CLID field may be populated with "unknown caller" only. Notably, it is envisioned that other embodiments may populate this CLID field, or provide other metadata, that serves to trigger recognition of the incoming call as a call directed to the SLS phone number of the SLS subscriber. As such, by describing the exemplary embodiment to populate this CLID field with a combination of the relationship number and a message, the scope of the disclosure will not be limited.

Having recognized that the incoming call is from the SLS platform 115, the SLS module 105 may store the combination of the reserved relationship number 1.678.444.0001 with the associated "next set of instructions" in the local SLS database 106 if does not have this combination already stored. To complete the exemplary call, the SLS module 105 may cause the message "unknown caller" to be rendered on display component 103 and rings the phone. Once the Subscriber #1 answers, the SLS platform 115 connects the two legs of the SLS (leg 1 represented by third party TD 120A to SLS platform 115 and leg 2 represented by SLS platform 115 to subscriber TD 110) by methods known and understood by those of ordinary skill in the art of telecommunications. As non-limiting examples, the calls can be connected via a forward or a bridge, as well as other technologies known to those with ordinary skill in the art.

Notably, it is envision by this disclosure that the call could be routed through the intermediate SLS platform 115 as a way of enabling the SLS between the third party TD 120 and the subscriber TD 110.

Notably, in the example, the combination of the reserved relationship number 1.678.222.0001 and the "next set of instructions" is now stored in the central SLS database 116 at SLS platform 115 and also in the local SLS database 106 in subscriber TD 110. As one of ordinary skill in the art will recognize, the importance of the reserved relationship number is that it may also provide a mechanism by which the SLS platform 115 may intercept SLS calls originating from subscriber TD 110 (in much the same way as the SLS phone number provides a mechanism by which the SLS platform may intercept SLS calls originating from the third party TD 120).

With regard to the second illustrative embodiment, suppose Subscriber #1 associated with subscriber TD 110 already has mobile phone service via its primary service provider using mobile phone number 1.408.544.1212. Subscriber #1 subscribes to an SLS provided by way of SLS platform 115 and is assigned SLS phone number 1.770.555.0001. However, instead of third party TD 120 placing a call to the Subscriber #1's SLS phone number 1.770.555.0001 (as described in the first illustrative embodiment), SLS platform 115 has received a call, signal, trigger or command to inform subscriber TD 110 that the subscriber has a voicemail waiting for it.

Consequently, the SLS platform 115 queries the reserved relationship number in Subscriber Reserved Relationship ID Table 320 such that when 1.770.555.0001 has a voicemail waiting for it, the interaction with the subscriber TD 110 (having primary phone number 1.408.544.1212) will use dialable reserved relationship number 1.678.444.0031. Notably, it is envisioned that a given reserved relationship number, such as reserved relationship number 1.678.444.0031 in the present example, may be used as a reserved relationship number for many different SLS subscribers. Moreover, it is envisioned that there can be an entire range of reserved relationship number, e.g., reserved relationship number 1.678.444.0031-1.678.444.0040, that are associated with the same "next set of instructions."

Now that the reserved relationship number 1.678.444.0031 has been selected, the SLS platform 115 may proceed to establish a call from the SLS platform 115 to the subscriber TD 110. The SLS platform 115 places the call to the subscriber TD 110. It is known to those with ordinary skill in the art that methods for establishing this call include the use of protocols and standards such as, but not limited to, SS7 protocol suite, SIP, CAMEL or CAP, ROSE, VOIP, etc. It is also envisioned that short message service ("SMS") protocol, multimedia messaging service ("MMS") protocol, and/or other protocols may be used by some embodiments. It is of course possible for the SLS platform 115 to direct the call to the primary number 1.408.544.1212 of the subscriber TD 110 using standard voice channels.

Returning to the illustrative embodiment, supposing that the call uses an MMS, the SLS Platform may include information in the call signal (either the voice channel, the data channel, within the MMS itself, in the CLID, etc.) from the SLS platform 115 to subscriber TD 110 for the SLS phone app running on SLS module 105. In some embodiments, this CLID field may contain the reserved relationship number established by the SLS platform 115 (in this example, 1.678.444.0031) and a message (in this example, "voicemail waiting"), separated by a dialable separator such as a "star" character. In other embodiments, the SLS module 105 may cause the subscriber TD 110 to be notified of the pending voicemail through a pop up notification via the SLS application running on the TD, via the operating system running on the TD, via another application running on the phone, etc. Notably, it is envisioned that other embodiments may include information in the call signal, or provide other metadata, that serves to trigger recognition of the pending voicemail. As such, by describing the exemplary embodiment as populating a message with a combination of the reserved relationship number and a message, the scope of the disclosure will not be limited.

In other non-limiting embodiments, the subscribed TD 110, having recognized that the incoming MMS is from the SLS platform 115, the SLS module 105 may store the combination of the reserved relationship number 1.678.444.0031 with the associated "next set of instruction" in the local SLS database 106 if does not have this combination already stored. To complete the exemplary call, the SLS module 105 may cause the message "voicemail waiting" to be rendered on display component 103 and rings the phone. Notably, in the example, the combination of the reserved relationship number 1.678.222.0031 and the "next set of instructions," inform the TD that a voicemail is waiting, is now stored in the central SLS database 116 at SLS platform 115 and also in the local SLS database 106 in subscriber TD 110.

With regard to the third illustrative embodiment, suppose Subscriber #1 desires to listen to a pending voicemail. Subscriber #1 must initiate a communication with the voicemail server from its SLS phone number 1.770.555.0001. Notably, it is envisioned by this disclosure that the SLS platform 115 may house a voicemail server for voicemails left for SLS subscribers. Those of ordinary skill in the art will understand how these voicemail servers operate and how these voicemail servers may be integrated into the system 100 and/or 101 for providing an SLS to a subscriber TD 110.

Like the Subscriber Reserved Relationship ID Table 320 maintained on central SLS database 116, Subscriber TD 110 also maintains a Subscriber Relationship ID Table 325 in local SLS database 106. It is envisioned by this disclosure that these Subscriber Relationship ID Tables can be synchronized, updated, reconciled, etc. with one another such that each table reflects substantially similar and up-to-date association information for the reserved relationship numbers. It is also envisioned by this disclosure that these Subscriber Relationship ID Tables may be purposely kept different from one another. To place calls from its SLS phone number, Subscriber #1 may use the SLS phone app of SLS module 105 to dial, as a non-limiting example of one potential embodiment, the reserved relationship number. Notably, one of ordinary skill in the art will recognize that the SLS phone app may have a button, short cut, or other previously programmed trigger for purposes of dialing the reserved relationship number without the subscriber having to directly dial and/or know the reserved relationship number.

In one non-limiting example, Subscriber #1 causes the SLS module 105 to dial the reserved relationship number 1.678.444.0031 when it selects a "call voicemail" button in the SLS phone app (not depicted in the FIGS). As described more fully above, the reserved relationship number 1.678.444.0031 is reflected in the Private Reserved Relationship ID Tables 320 and 325 as being associated with the "next set of instructions" "route the call directly to voicemail server". Notably, it is envisioned by this disclosure that the "next set of instructions" may route the call to voicemail on a third party network device, on a database communicatively coupled to the communications network 125, etc.

Regardless of which embodiment causes the SLS module 105 to select from Subscriber Reserved Relationship ID Table 325 in local SLS database 106 the reserved relationship number 1.678.444.0021, the SLS module 105 dials the reserved relationship number 1.678.444.0021. The SLS module 105 may indicate to the SLS subscriber via display 103 that it is calling "voicemail", but instead it calls the reserved relationship number 1.678.444.0021. By calling this reserved relationship number, the communications network 125 routes the call to the SLS platform 115 instead of subscriber TD communicating directly with the voicemail server, for example. This is the first leg of the SLS.

When the SLS platform 115 processes this first leg of the SLS, it may recognize that the calling number is the SLS subscriber's primary number 1.408.544.1212 (which is associated with the subscriber's SLS phone number 1.770.555.0001) and the called number is the reserved relationship number 1.678.444.0021. Querying the Subscriber Reserved Relationship ID Table 320 in central SLS database 116, the redirection module 117 may apply the following logic: "when primary number 1.408.544.1212 calls reserved relationship number 1.678.444.0021, it is actually SLS phone number 770.555.0001 wanting to access its voicemail." The SLS platform 115 may then follow that logic and complete the second leg of the SLS by establishing a communication with the voicemail server. Notably, it is envisioned by this disclosure that the SLS platform 115 may establish the communication with the voicemail server by dialing a phone number associated with the voicemail server using the SLS number 1.770.555.0001. It is known to those with ordinary skill in the art that methods for establishing this communication include the use of protocols and standards such as, but not limited to, SS7 protocol suite, SIP, CAMEL or CAP, ROSE, VOIP, etc.

Notably, in completing the second leg of the SLS and connecting the two legs (in much the same way as described above for SLS calls originating from a third party), the SLS platform 115 may modify the CLID field displayed for the benefit of the voicemail server to be something other than the SLS phone number 1.770.555.0001 from which the second leg of the SLS is made. As a non-limiting example, it is envisioned that the SLS platform 115 may modify the CLID field to be the primary number of subscriber TD 110.

As described above, it is envisioned that another SLS subscriber (for example, Subscriber #2 having SLS phone number 1.770.555.0002) could also initiate the first leg of an SLS call by using the reserved relationship number 1.678.444.0021. In this situation, the SLS platform 115 could direct the second leg of the SLS to a different voicemail server associated with Subscriber #2 or an entirely different "next set of instructions" may be performed by the SLS platform 115. As is described above, the encoded voicemail server phone number called by the SLS platform 115 for the second leg of the call is derived from the combination of the SLS phone number and the reserved relationship number and is part of the "next set of instructions" to be performed.

FIGS. 4A-4E collectively illustrate an exemplary method 400 for implementing an SLS call between a third party TD, such as third party TD 120, and a TD associated with an SLS subscriber, such as subscriber TD 110, using reserved relationship number. Method 400 takes into consideration circumstances when the call signal from the third party TD 120 does not include the CLID or any other data useful for identification of the phone number being used by and associated with third party TD 120 for the call. At block 402, a call is directed to and received by an SLS platform 115. Notably, the call is envisioned to be any communication over communications network 125 that is directed to SLS platform 115, regardless of whether such communication originates from a subscriber TD 110 or a third party TD 120. One of ordinary skill in the art will recognize that a communication may include the use of protocols and standards such as, but not limited to, SS7 protocol suite, SIP, CAMEL or CAP, ROSE, VOIP, etc.

Next, at decision block 404, the SLS platform 115 determines whether the call originated from a third party TD 120 directed to an SLS subscriber, i.e., whether a third party has dialed an SLS phone number associated with an active SLS subscriber. If the communication was not a call that originated from a third party TD 120, then the "no" branch is followed to block 432 of FIG. 4D. If the call did, in fact, originate from a third party TD 120, then the "yes" branch is followed to block 405. Notably, if a call is directed to the SLS platform 115, one of ordinary skill in the art will recognize that the communication was either a call to an SLS phone number (if dialed by a third party TD 120), a call to a relationship number (if originating from an SLS client of a subscriber TD 110), or a data communication originating from an SLS client of a subscriber TD 110 (not depicted in the figures).

At block 405, the SLS platform 115 attempts to obtain the phone number being used by third party TD 120 to call the SLS phone number associated with subscriber TD 110. If at decision block 406, the SLS platform 115 is unable to obtain the phone number being used by third party TD 120 because the call signal from the third party TD 120 does not include the CLID or any other data useful for identification of the phone number being used by and associated with third party TD 120 to call the SLS phone number associated with subscriber TD 110, then the "no" branch is followed to block 452 of FIG. 4B. If the SLS platform 115 is able to successfully obtain the phone number being used by third party TD 120 to call the SLS phone number associated with subscriber TD, then the "yes" branch is followed to block 407.

At block 407, the SLS platform 115 queries central SLS database 116 for the phone number being used by third party TD 120 in association with the SLS phone number that caused the call to be routed to the SLS platform 115. If at decision block 408, the SLS platform 115 successfully queries the phone number being used by third party TD 120 and SLS phone number combination, then the "yes" branch is followed to block 422 of FIG. 4C. If the phone number being used by third party TD 120 and SLS phone number combination are not successfully queried, then the "no" branch is followed to block 410.

At block 410, the SLS platform 115 may associate a new relationship number with the phone number being used by third party TD 120 to make the call, the SLS subscriber's primary phone number and the subscriber's SLS phone number. At block 412, the central SLS database 116 is updated to include the newly created record—the phone number being used by third party TD 120 to make the call is listed as a contact of the SLS subscriber in the Subscriber Relationship ID Table 310. At block 414, a call is established between the SLS platform 115 and the subscriber TD 110. In some non-limiting embodiments of block 414, the SLS platform 115 initiates the call through the communication network 125's voice channel with the subscriber TD 110 by dialing its primary phone number from the relationship number of block 410. In other non-limiting embodiments of block 414, the subscriber's TD 110 initiates the call through the communication network 125's voice channel with the SLS platform 115 by dialing the relationship number of block 410 from the subscriber TD 110's primary phone number after receiving a data communication from the SLS platform 115 with information containing the relationship number of block 410 and instructions to initiate the call (again, one of ordinary skill in the art will recognize that a communication may include the use of protocols and standards such as, but not limited to, SS7 protocol suite, SIP, CAMEL or CAP, ROSE, VOIP, etc). In certain non-limiting embodiments of block 414, the SLS platform 115 may populate the CLID field of the call between it and the subscribers TD 110 with a combination of the newly assigned relationship number and the phone number being used by third party TD 120 to make the call.

At block 416, the local SLS database 106 updates to include the newly assigned relationship number in association with the phone number being used by third party TD 120 to make the call. At block 418, the phone number being used by third party TD 120 to make the call is displayed to the SLS subscriber and the SLS subscriber is alerted to the incoming call. Notably, it is envisioned that displaying the phone number being used by third party TD 120 to make the call may include rendering the CLID field itself, rendering a picture of the third party, rendering a name, etc. as is understood by those with ordinary skill in the art of graphical user displays and interfaces. At block 420, the call from block 402 is bridged with the call from block 414 resulting in an active call between third party TD 120 and subscriber TD 110. One of ordinary skill in the art will recognize that there are many systems and methods known and understood for bridging or connecting a plurality of separate calls (the legs of the SLS); consequently, this disclosure is not limited by the used example "bridged."

It is envisioned that the steps taken at block 418 of the method 400 may differ in some embodiments. For instance, when a third party TD 120's call to an SLS phone number is received at the SLS platform 115, and the phone number being used by third party TD 120 to make the call is not yet associated with a relationship number, the SLS platform 115 may assign a next relationship number as described relative to blocks 410-412 then establish a call with the subscriber TD 110 as described in 414. The SLS module 105 of the subscriber TD 110, having no record of the new relationship number in its local database 106, may display the calling number as "unknown caller" on the display of the subscriber TD 110. At the same time, the SLS module 105 may establish a data connection over communications network 125 with the SLS platform 115 for the purpose of acquiring the third party calling number associated with the new relationship number. Once the phone number being used by third party TD 120 to make the call is acquired, the SLS module 105 may update the local database 106 and change the display from "unknown caller" to the phone number being used by third party TD 120 to make the call.

Figure 4A:
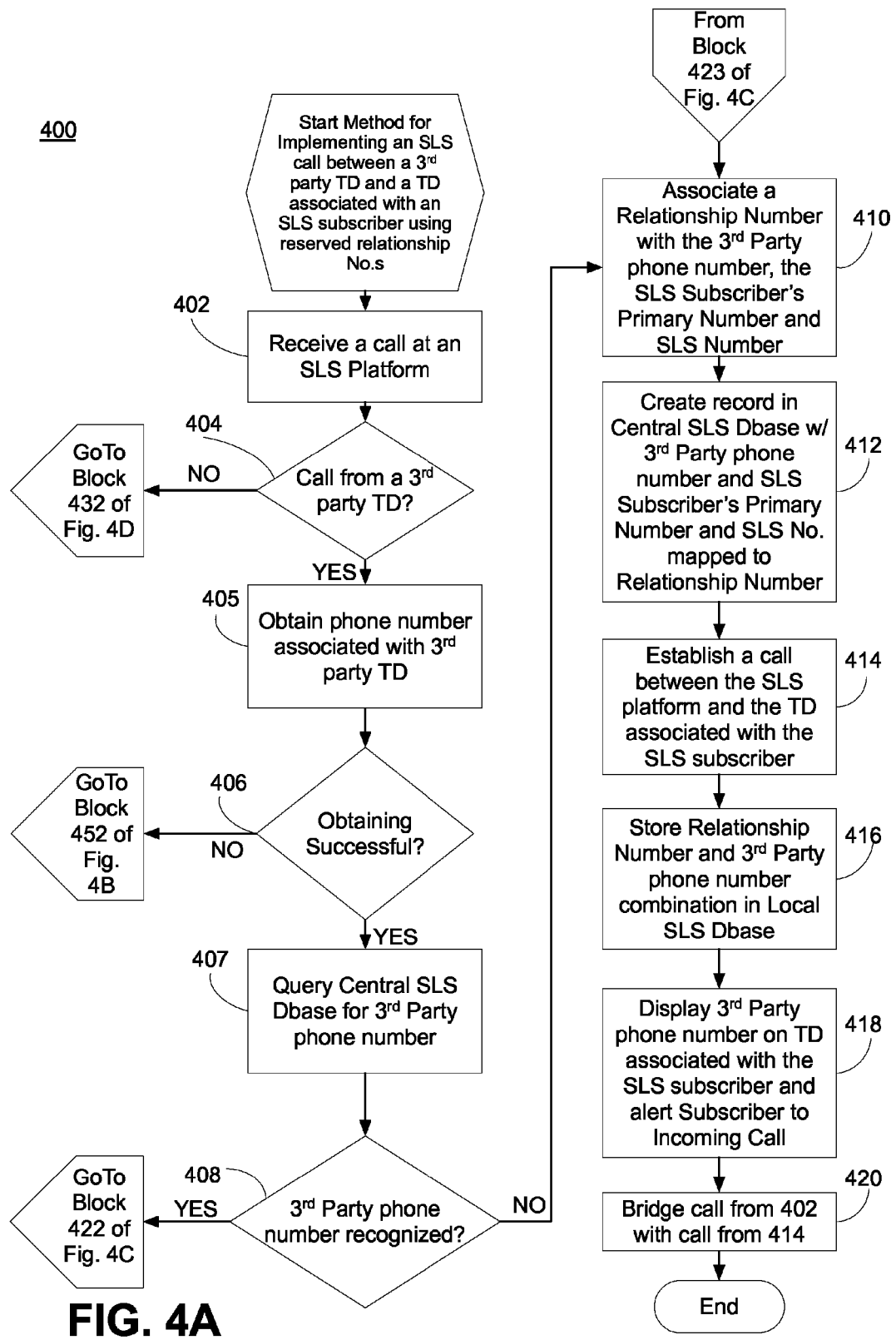
Figure 4B:
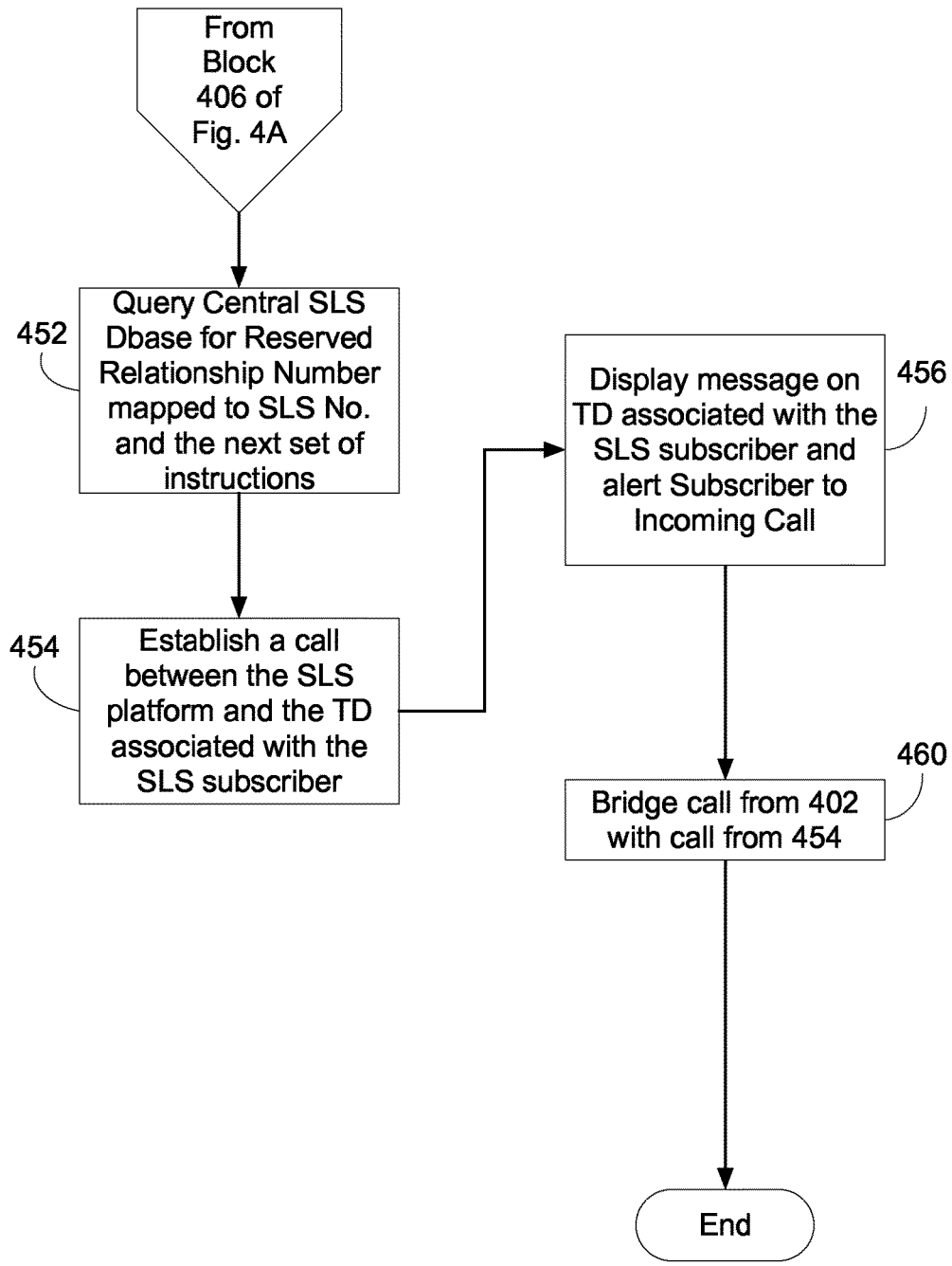

Turning now to FIG. 4B, if the "no" branch is followed from block 406 of FIG. 4A, at decision block 452 the SLS platform 115 queries the central SLS database 116 for the reserved relationship number that maps to the combination of the subscriber's SLS phone number and the "next set of instructions" "include information in the call signal indicating that the caller is unknown".

At block 454, a call is established between the SLS platform 115 and the subscriber TD 110. In some non-limiting embodiments of block 454, the SLS platform 115 initiates the call through the communication network 125's voice channel with the subscriber TD 110 by dialing its primary phone number from the reserved relationship number of block 452. In other non-limiting embodiments of block 454, the subscriber's TD 110 initiates the call through the communication network 125's voice channel with the SLS platform 115 by dialing the reserved relationship number of block 452 from the subscriber TD 110's primary phone number after receiving a data communication from the SLS platform 115 with information containing the reserved relationship number of block 452 and instructions to initiate the call. In certain non-limiting embodiments of block 454, the SLS platform 115 may populate the CLID field of the call between it and the subscribers TD 110 with a combination of the assigned reserved relationship number and a message indicating "unknown caller".

It is envisioned that in some embodiments of block 454 an SLS module 105 may recognize that an incoming call is from the SLS platform 115 by virtue of the call originating from a reserved relationship number. At block 456, a message is displayed to the SLS subscriber and the SLS subscriber is alerted to the incoming call. At block 460, the call from block 402 is bridged with the call from block 454 resulting in an active call between third party TD 120 and subscriber TD 110. One of ordinary skill in the art will recognize that there are many systems and methods known and understood for bridging or connecting a plurality of separate calls (the legs of the SLS); consequently, this disclosure is not limited by the used example "bridged." It is envisioned that, if the subscriber elects not to answer a call to the SLS phone number, the SLS module 105 in some non-limiting embodiments may use a voicemail service or message service in response to the unanswered call. That is, it is envisioned that an SLS service may provide features and services dedicated to the SLS subscriber and separate from similar features and services associated with the subscriber's primary number.

Figure 4C:
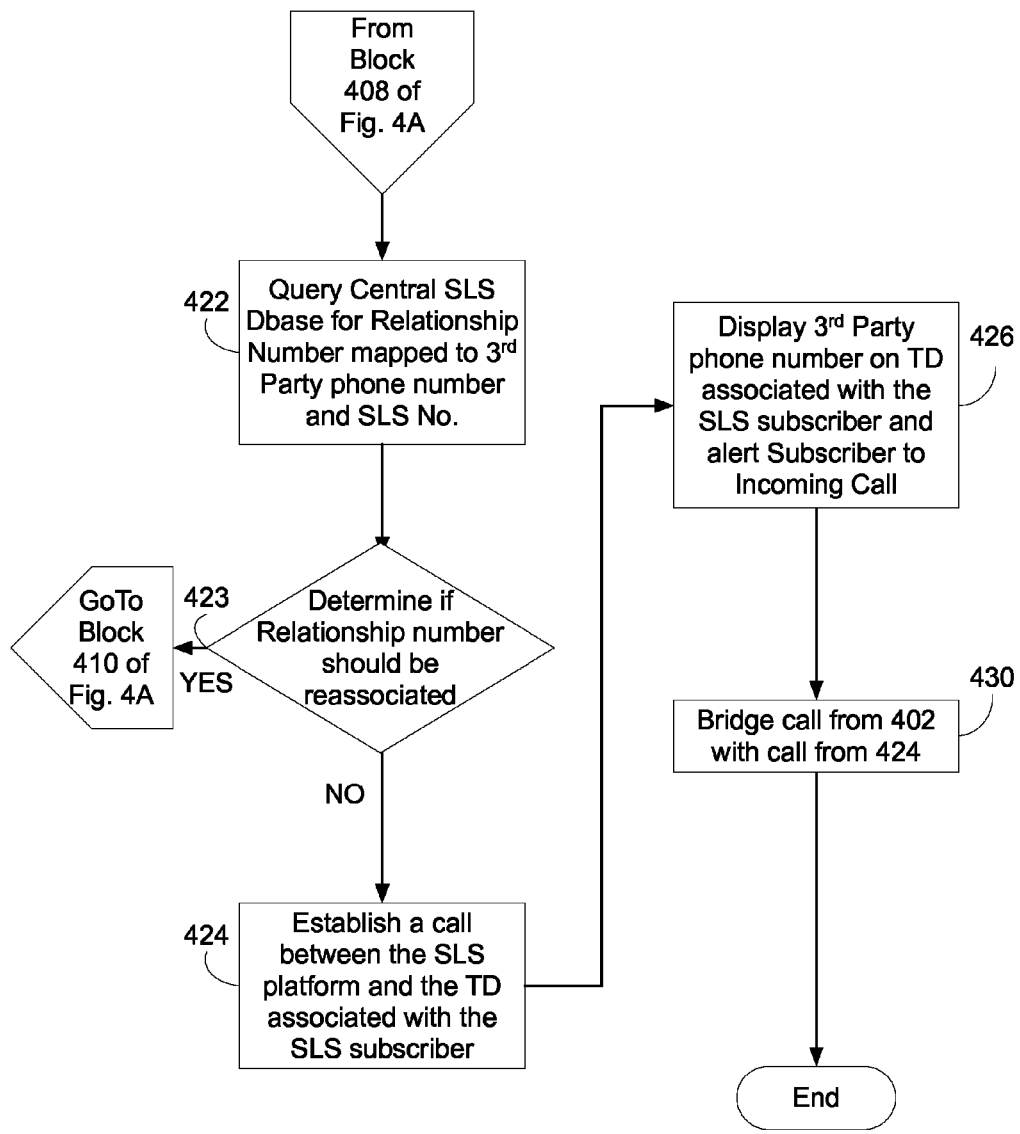

Turning now to FIG. 4C, if the "yes" branch is followed from decision block 408 of FIG. 4A, at block 422 the SLS platform 115 queries the central SLS database 116 for the relationship number that maps to the combination of the phone number being used by third party TD 120 and subscriber's SLS phone number. At block 423, the SLS platform 115 determines if it should modify the relationship number of block 422 based on the location of the subscriber TD 110. If at decision block 423 the SLS platform 115 determines that it should modify the relationship number of block 422, then the "yes" branch is followed to block 410 of FIG. 4A. If at decision block 423 the SLS platform 115 determines that it should not modify the relationship number of block 422, then the "no" branch is followed to block 424.

At block 424, a call is established between the SLS platform 115 and the subscriber TD 110. In some non-limiting embodiments of block 424, the SLS platform 115 initiates the call through the communication network 125's voice channel with the subscriber TD 110 by dialing its primary phone number from the relationship number of block 422. In other non-limiting embodiments of block 414, the subscriber's TD 110 initiates the call through the communication network 125's voice channel with the SLS platform 115 by dialing the relationship number of block 422 from the subscriber TD 110's primary phone number after receiving a data communication from the SLS platform 115 with information containing the relationship number of block 422 and instructions to initiate the call. In certain non-limiting embodiments of block 414, the SLS platform 115 may populate the CLID field of the call between it and the subscribers TD 110 with a combination of the assigned relationship number and the phone number being used by third party TD 120 to make the call.

It is envisioned that in some embodiments of block 424 an SLS module 105 may recognize that an incoming call is from the SLS platform 115 by virtue of the call originating from a relationship number. At block 426, the phone number being used by third party TD 120 to make the call is displayed to the SLS subscriber and the SLS subscriber is alerted to the incoming call. Notably, it is envisioned that displaying the phone number being used by third party TD 120 to make the call may include rendering the CLID itself, rendering a picture of the third party, rendering a name, etc. as is understood by those with ordinary skill in the art of graphical user displays and interfaces. In certain non-limiting embodiments of block 426, the information populated by the SLS platform 115 in the CLID field of the call between SLS platform 115 and the subscribers TD 110 may cause the SLS module 105 to handle the call and display the associated third party CLID for the benefit of the subscriber.

At block 430, the call from block 402 is bridged with the call from block 424 resulting in an active call between third party TD 120 and subscriber TD 110. One of ordinary skill in the art will recognize that there are many systems and methods known and understood for bridging or connecting a plurality of separate calls (the legs of the SLS); consequently, this disclosure is not limited by the used example "bridged." It is envisioned that, if the subscriber elects not to answer a call to the SLS phone number, the SLS module 105 in some non-limiting embodiments may use a voicemail service or message service in response to the unanswered call. That is, it is envisioned that an SLS service may provide features and services dedicated to the SLS subscriber and separate from similar features and services associated with the subscriber's primary number.

Figure 4D:
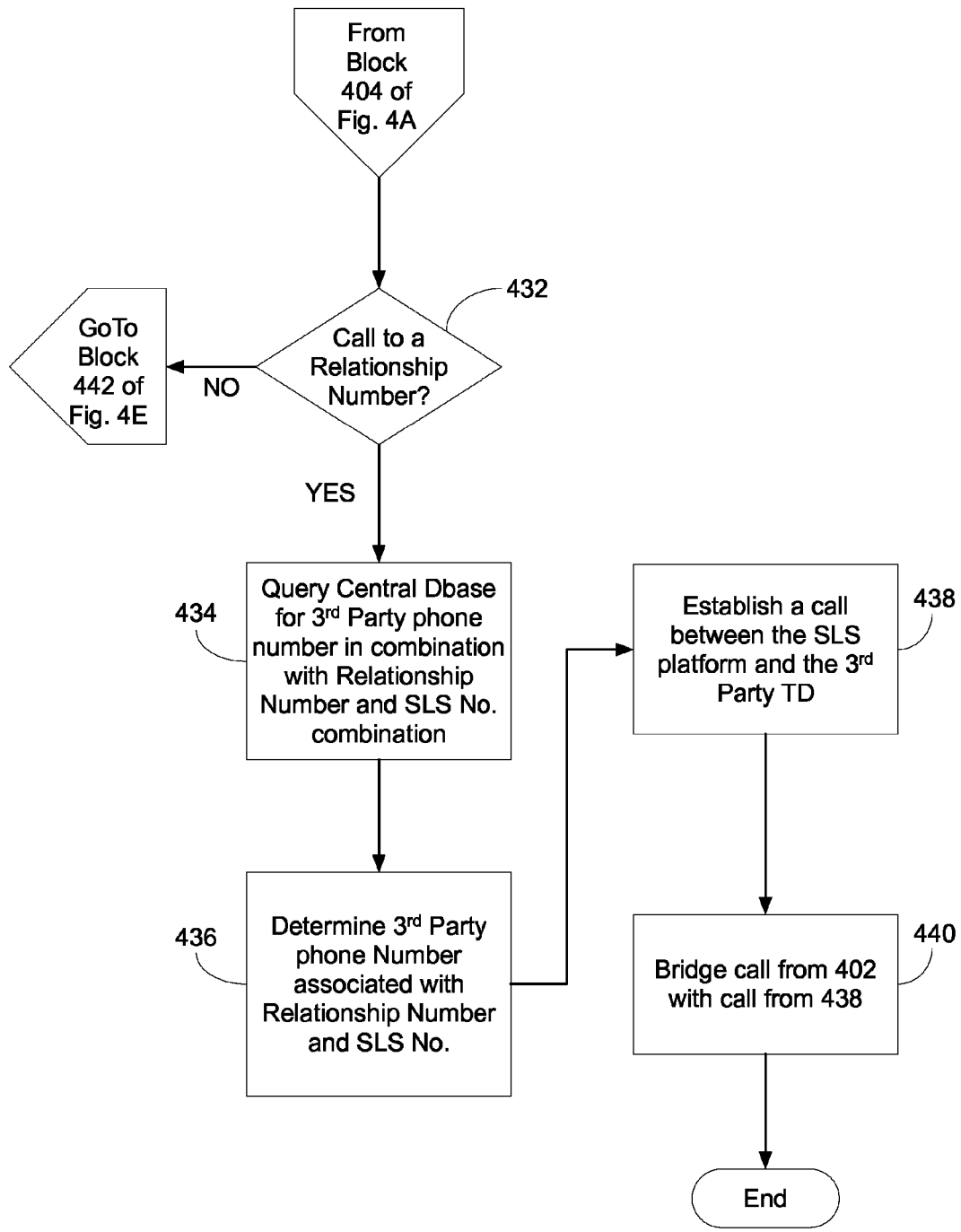

Turning now to FIG. 4D, if the "no" branch is followed from block 404 of FIG. 4A, at decision block 432 the SLS platform 115 determines if the call was directed to a relationship number. Notably, if the call is directed to a relationship number, then it must have originated from a subscriber TD 110. If the call was not directed to a relationship number, the "no" branch is followed to block 442 of FIG. 4E. If, however, the call was routed to the SLS platform 115 because it was directed to a relationship number then the "yes" branch is followed to block 434.

At block 434, the central SLS database 116 is queried for the third party TD 120's phone number in combination with the relationship number that was dialed by subscriber TD 110 that resulted in the call routing to the SLS platform 115 and the SLS phone number and the SLS subscriber's primary phone number. At block 436, the SLS platform 115 determines the third party TD 120's phone number with which the relationship number and the SLS subscriber's primary phone number combination is associated. At block 438, a call is established between the SLS platform 115 and the third party TD 120. In some non-limiting embodiments of block 438, the SLS platform 115 initiates the call through the communication network 125's voice channel with the third party TD 120 by dialing the third party TD 120's phone number determined in block 436. In some non-limiting embodiments of block 438, the SLS platform 115 may populate the CLID field of the call between it and the third party TD 120 with the SLS phone number of subscriber TD 110. In other non-limiting embodiments of block 438, the SLS platform 115 may populate the CLID field of the call between it and the third party TD 120 with the primary phone number of subscriber TD 110.

At block 440, the call from block 402 is bridged with the call from block 438 resulting in an active call between subscriber TD 110 and third party TD 120. One of ordinary skill in the art will recognize that there are many systems and methods known and understood for bridging or connecting a plurality of separate calls (the legs of the SLS); consequently, this disclosure is not limited by the used example "bridged." It is envisioned that, if the third party elects not to answer a call to it from SLS, the SLS platform 115 in some non-limiting embodiments may continue the bridge even when the call from block 438 is routed to its voicemail service or message service.

Figure 4E:
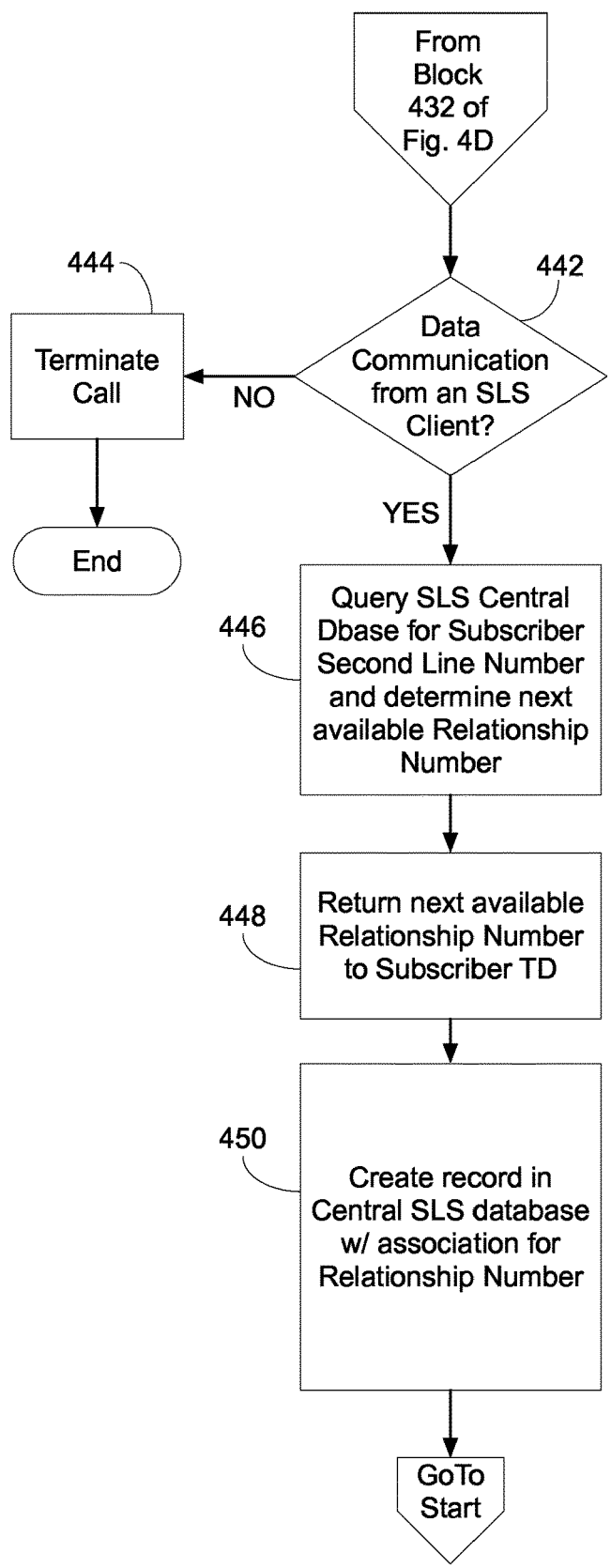

Turning now to FIG. 4E, if the "no" branch is followed from block 432 of FIG. 4D, at decision block 442 the SLS platform 115 determines that the communication is a data communication over communications network 125 that originated from an SLS client of a subscriber TD 110. If not, then it is assumed that it was an errant communication and the "no" branch is followed to block 444 and the communication is disconnected. If the communication did originate from a SLS client, i.e., an SLS module 105 in a subscriber TD 110 associated with a subscriber to the SLS service, then the "yes" branch is followed to block 446. It is envisioned that the communication from an SLS client application to an SLS platform may be of any protocol suitable for communicating over communications network 125 including the use of protocols and standards such as, but not limited to, SS7 protocol suite, SIP, CAMEL or CAP, ROSE, VOIP, etc.

At block 446, it is deduced by the SLS platform 115 that the subscriber associated with the calling SLS client desires to use the SLS service to call third party TD 120's phone number with which no relationship number has been previously associated (such as would occur at block 410) The SLS module 105 has provided the request for the new relationship number, along with the third party number it desires to call, to the SLS platform 115 via the data communication. The central SLS database 116 is queried at block 446 to determine the next available relationship number for the subscriber's given SLS phone number.

The SLS platform 115 may associate a new relationship number with the subscriber's SLS phone number, the SLS subscriber's primary phone number and the third party TD 120's phone number. It is envisioned that the SLS module 105 may communicate with the SLS platform 115 in some embodiments to obtain a relationship number for a third party that has not previously been called via a session-based protocol such as, but not limited to, an unstructured supplementary services data ("USSD") protocol. As is understood in the art of telecommunications protocols, a gateway such as a USSD gateway may be used to route messages from a signaling network to service applications and back. In this way, certain embodiments of an SLS module 105 may communicate with an SLS platform 115 to designate and acquire a relationship number to a third party who has not been called by the subscriber before via the SLS.

Moreover, USSD is offered herein for exemplary purposes and is not meant to limit the type of communications protocol that may be used by certain embodiments. For example, it is envisioned that short message service ("SMS") protocol, multimedia messaging service ("MMS") protocol, and/or other protocols may be used by some embodiments. It is envisioned that an IP-based interaction over the TD's data service may be used by some embodiments. As would be recognized by one of ordinary skill in the art, use of session based protocols or other communication protocols may minimize temporal delays in allocating and acquiring relationship numbers between an SLS module 105 and an SLS platform 115. In fact, it is anticipated that any mechanism that can be used to establish a communication path between the SLS module 105 and the SLS platform 115 for the purposes of supporting the SLS can be utilized. This may include any of the varieties of cellular data, WiFi, Bluetooth technologies, proprietary wireless or wired technologies, etc. Such channels can be used in setting up the relationship databases, sharing information between the SLS module 105 and the SLS platform 115, initiating voice communication establishment from the TD 110 to the SLS platform 115, the TD 110 requesting the SLS platform 115 to place a call to a third party TD 120, etc.

At block 448, the determined next available relationship number is returned to the SLS module 105 of the subscriber TD 110. At block 450, the central SLS database 116 is updated with the new relationship number. The new relationship number is now associated in the central SLS database 116 with the subscriber's SLS phone number, the SLS subscriber's primary phone number and the third party TD 120's phone number. Notably, after blocks 448 and/or 450, the method 400 may return to the start of method 400 at block 402 as the SLS module 105 of the subscriber TD 110 has acquired a new relationship number. Consequently, using the newly acquired relationship number may essentially start over the method 400 with the SLS platform 115 receiving the call. If so, the method 400 would follow to FIG. 4D where the call was recognized as the subscriber TD 110 having placed a call to the new relationship number.

Figure 5A:
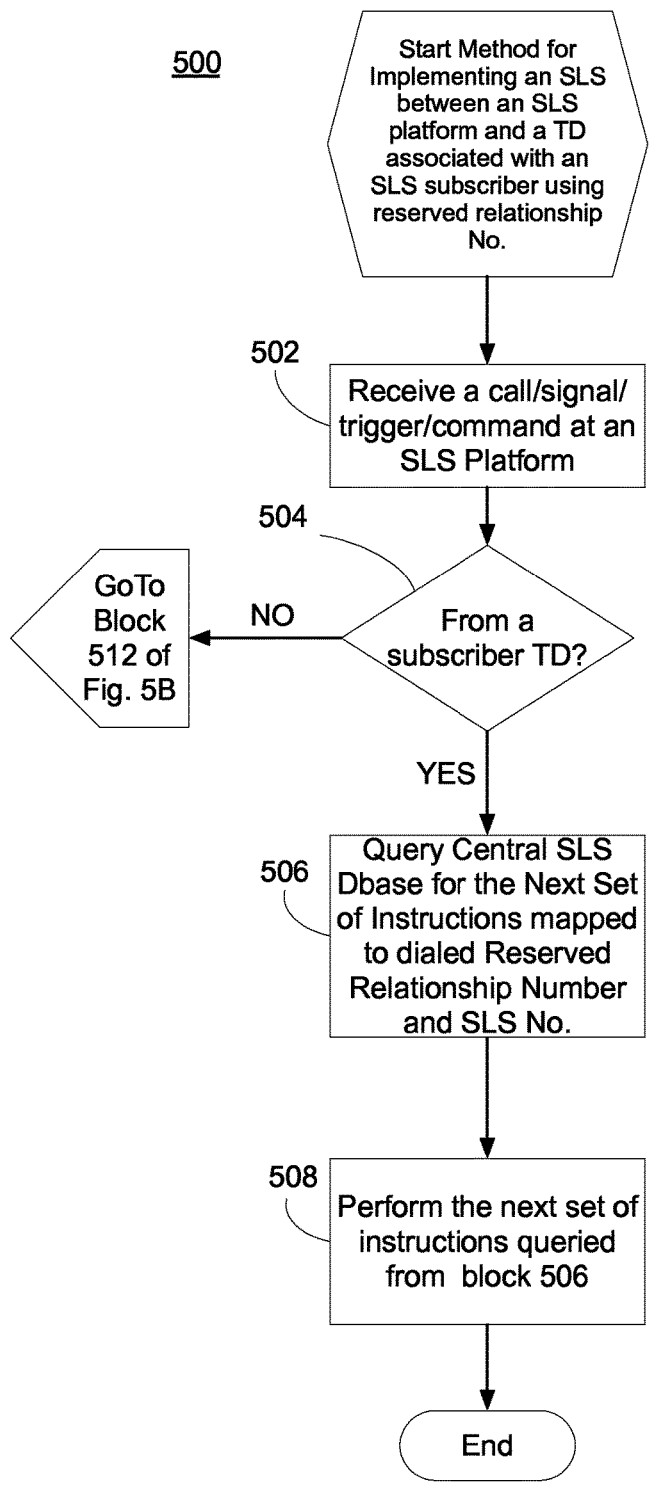
FIGS. 5A-5B collectively illustrate an exemplary method for implementing an SLS, and its associated "next set of instructions," between the SLS platform and a TD associated with an SLS subscriber using a reserved relationship numbers.
Figure 5B:
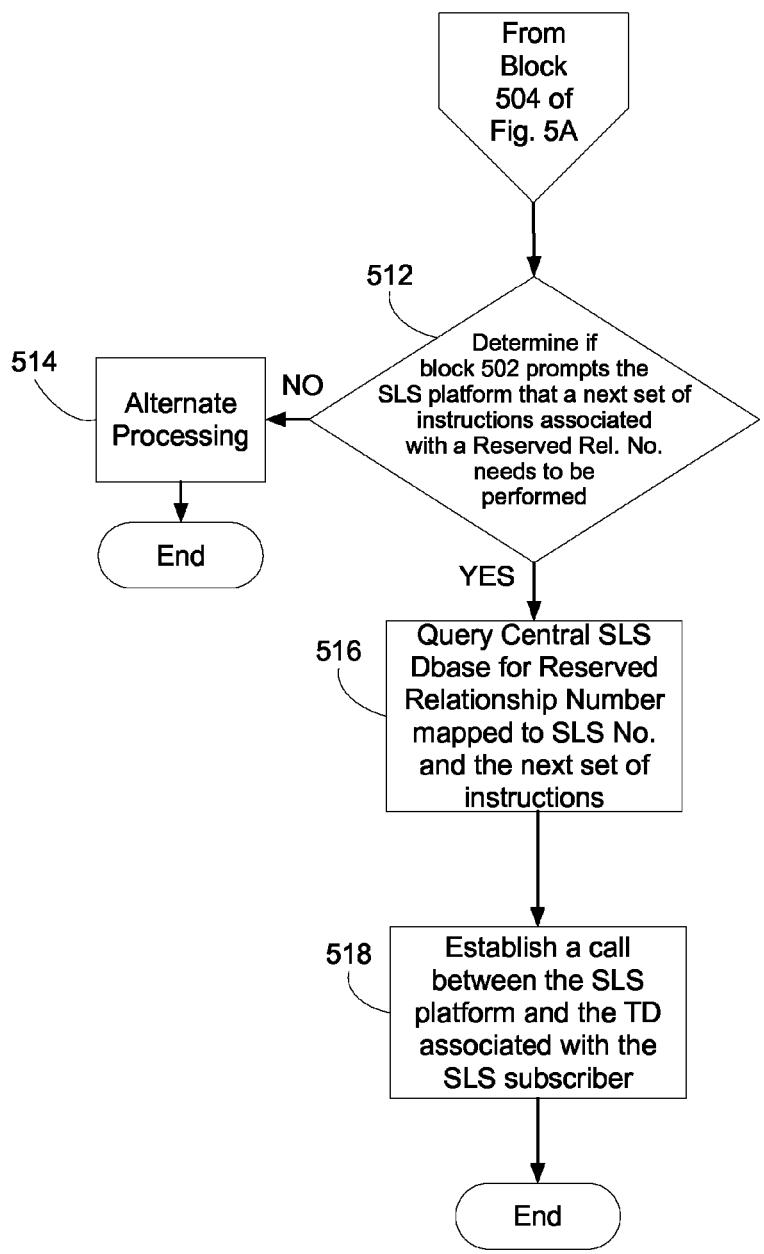

Turning now to FIGS. 5A-5B, these figures collectively illustrate an exemplary method 500 for implementing an SLS, and its associated "next set of instructions," between SLS platform 115 and a TD associated with an SLS subscriber, such as subscriber TD 110, using a reserved relationship number. At block 502, a call, signal, trigger or command is directed to and received by an SLS platform 115. Notably, the call, signal, trigger or command is envisioned to originate from within the SLS platform 115, i.e., from its own internal software or hardware, or from an external network element that is communicatively coupled to the SLS platform through communications network 125, e.g., a third party voicemail server, a third party TD 120, etc. One of ordinary skill in the art will recognize that a call, signal, trigger or command from an external network element may include the use of protocols and standards such as, but not limited to, SS7 protocol suite, SIP, CAMEL or CAP, ROSE, VOIP, etc. Additionally, it is envisioned by this disclosure that the call, signal, trigger or command may prompt the SLS platform 115 that the "next set of instructions" associated with a reserved relationship number is need to be performed, e.g., (1) a voicemail server transmits a signal to the SLS platform 115 prompting the SLS platform that the "next set of instructions" "inform the TD that a voicemail is waiting" is needed to be performed, or (2) a subscriber TD 110 initiates a call with the SLS platform 115 prompting the SLS platform that the "next set of instructions" "route the call directly to voicemail server" (to be described more fully below).

Next, at decision block 504, the SLS platform 115 determines whether the call, signal, trigger or command originated from a subscriber TD 110, i.e., whether a subscriber TD 110 has dialed a reserved relationship number associated with its SLS. If the communication was not a call, signal, trigger or command that originated from a subscriber TD 110, then the "no" branch is followed to block 512 of FIG. 5B. If the call, signal, trigger or command did, in fact, originate from a subscriber TD 110, then the "yes" branch is followed to block 506. At block 506 the SLS platform 115 queries the central SLS database 116 for the "next set of instructions" that maps to the combination of the reserved relationship number at which the subscriber TD 110 directed the call and the subscriber's SLS phone number.

At block 508, the SLS platform 115 performs the "next set of instructions" queried from block 506. Notably, it is envisioned by this disclosure that performance of these instructions may involve one or multiple steps and that these steps may involve one or more pieces of hardware/software separate and distinct from the SLS platform 115. Those of ordinary skill in the art will recognize that, depending on the nature of the "next set of instructions" associated with the reserved relationship number, e.g., instructions involving networking and the internet, instructions involving physical processes like printing, instructions involving complex search algorithms and instructions involving third party software, multiple components of the SLS platform 115 and/or other communicatively coupled pieces of hardware may be used to perform and/or process the "next set of instructions." Finally, it is also envisioned by this disclosure that the possible combinations of reserved relationship numbers and "next set of instructions" are not limited by the three specific examples described herein. As a non-limiting example, the SLS module 105 may perform all the steps, functions, processing, etc. related to the "next set of instructions" "route the call directly to voicemail server".

Turning now to FIG. 5B, if the "no" branch is followed from block 504 of FIG. 5A, at decision block 512 the SLS platform 115 determines if the call, signal, trigger or command directed to and received by SLS platform 115 at block 502 prompts the SLS platform 115 that a "next set of instructions" associated with a reserved relationship number is need to be performed. If not, then the call, signal, trigger or command directed to and received by SLS platform 115 at block 502 receives alternate processing at block 514. The alternate processing of 514 is not within the scope of this disclosure. If the call, signal, trigger or command directed to and received by SLS platform 115 at block 502 does prompt the SLS platform 115 that a "next set of instructions" associated with a reserved relationship number is need to be performed then the "yes" branch is followed to block 516. Notably, it is envisioned by this disclosure that the SLS platform 115 may be able to perform block 512 using information included within the call, signal, trigger or command directed to and received by SLS platform 115 at block 502. Moreover, it is envisioned by this disclosure that the SLS platform 115 may be able to perform block 512 through previous programming, information, or algorithms stored within the SLS platform 115. It is also envisioned by this disclosure that the SLS platform 115 may be able to perform block 512 through communication with third party entities, elements, computers, software, hardware, etc. using communications network 125.

Additionally, it is envisioned by this disclosure that performance of block 512 may involve one or multiple steps and that these steps may involve one or more pieces of hardware/software separate and distinct from the SLS platform 115. Those of ordinary skill in the art will recognize that, depending on the nature of the call, signal, trigger or command directed to and received by SLS platform 115 at block 502, multiple components of the SLS platform 115 and/or other communicatively coupled pieces of hardware may be used.

At block 516, the SLS platform 115 queries the central SLS database 116 for the reserved relationship number that maps to the combination of the subscriber's SLS phone number and the "next set of instructions" determined at block 512. At block 518, a call is established between the SLS platform 115 and the subscriber TD 110. In some non-limiting embodiments of block 518, the SLS platform 115 initiates the call through the communication network 125's voice channel with the subscriber TD 110 by dialing its primary phone number from the reserved relationship number of block 516. In other non-limiting embodiments of block 518, the subscriber's TD 110 initiates the call through the communication network 125's voice channel with the SLS platform 115 by dialing the reserved relationship number of block 516 from the subscriber TD 110's primary phone number after receiving a data communication from the SLS platform 115 with information containing the reserved relationship number of block 516 and instructions to initiate the call. It is envisioned that in some embodiments of block 518 an SLS module 105 may recognize that an incoming call is from the SLS platform 115 by virtue of the call originating from a reserved relationship number.

Although not depicted in FIG. 5B, after block 518 the SLS module 105 queries the local SLS database 106 for the "next set of instructions" that maps to the combination of the reserved relationship number from which the SLS platform 115 directed the call and the subscriber's SLS phone number. The SLS module 105 then performs the "next set of instructions" previously queried. As a non-limiting example, the SLS module 105 may perform all the steps, functions, processing, etc. related to the "next set of instructions" "inform the TD that a voicemail is waiting".

Certain steps or blocks in the processes or process flows described in this specification naturally precede others for the invention to function as described. However, the invention is not limited to the order of the steps or blocks described if such order or sequence does not alter the functionality of the invention. That is, it is recognized that some steps or blocks may performed before, after, or parallel (substantially simultaneously with) other steps or blocks without departing from the scope and spirit of the invention. In some instances, certain steps or blocks may be omitted or not performed without departing from the invention. Also, in some instances, multiple actions depicted and described as unique steps or blocks in the present disclosure may be comprised within a single step or block. Further, words such as "thereafter", "then", "next", "subsequently", etc. are not intended to limit the order of the steps or blocks. These words are simply used to guide the reader through the description of the exemplary method.

Additionally, one of ordinary skill in programming is able to write computer code or identify appropriate hardware and/or circuits to implement the disclosed invention without difficulty based on the flow charts and associated description in this specification, for example. Therefore, disclosure of a particular set of program code instructions or detailed hardware devices is not considered necessary for an adequate understanding of how to make and use the invention. The inventive functionality of the claimed computer implemented processes is explained in more detail in the above description and in conjunction with the Figures which may illustrate various process flows.

In one or more exemplary aspects, the functions described may be implemented in hardware, software, firmware, or any combination thereof. If implemented in software, the functions may be stored on or transmitted as one or more instructions or code on a computer-readable medium. Computer-readable media include both computer storage media and communication media including any medium that facilitates transfer of a computer program from one place to another.

A storage media may be any available media that may be accessed by a computer. By way of example, and not limitation, such computer-readable media may comprise RAM, ROM, EEPROM, CD-ROM or other optical disk storage, magnetic disk storage or other magnetic storage devices, or any other medium that may be used to carry or store desired program code in the form of instructions or data structures and that may be accessed by a computer.

Also, any connection is properly termed a computer-readable medium. For example, if the software is transmitted from a website, server, or other remote source using a coaxial cable, fiber optic cable, twisted pair, digital subscriber line ("DSL"), or wireless technologies such as infrared, radio, and microwave, then the coaxial cable, fiber optic cable, twisted pair, DSL, or wireless technologies such as infrared, radio, acoustic and microwave are included in the definition of medium.

Disk and disc, as used herein, includes compact disc ("CD"), laser disc, optical disc, digital versatile disc ("DVD"), floppy disk and blu-ray disc where disks usually reproduce data magnetically, while discs reproduce data optically with lasers. Combinations of the above should also be included within the scope of computer-readable media.

Therefore, although selected aspects have been illustrated and described in detail, it will be understood that various substitutions and alterations may be made therein without departing from the spirit and scope of the present invention, as defined by the following claims.

What is claimed is:

1. A method for providing a service that has been requested by a subscriber of a second line service ("SLS"), the method comprising the actions of:
    an SLS platform receiving a data communication that is initiated by the originating TD that is communicatively coupled to the SLS platform through a communications network and wherein the originating TD is provisioned with the SLS and has at least one SLS phone number assigned there to and is also associated with a primary phone number;
    the SLS platform associating the reserved relationship number with (1) the at least one SLS phone number, (2) a service and (3) the primary phone number of the originating TD, and creating a database entry for the association;
    the SLS platform transmitting the reserved relationship number to the originating TD in response to the data communication;
    the SLS platform receiving a call initiation request that is invoked by the originating telecommunications device ("TD") initiating a call to the reserved relationship number, wherein the reserved relationship number consists only of a valid network terminable number that is recognized by the telephone network as being a number to be processed by the SLS platform and, wherein the reserved relationship number does not include any other information or any prefix or suffix, wherein the call initiation request is transmitted without the inclusion of a calling line identification of the originating TD;
    the SLS platform selecting an entry from a database, wherein the entry is selected based on the received reserved relationship number, and wherein the entry identifies the primary phone number of the originating TD, a particular SLS number assigned to the originating TD and the service; and
    initiating the provision of the service by the SLS platform, such service being rendered to the requesting originating TD and being attributed to the particular SLS phone number.

2. A method for providing a requested service to a second line service ("SLS") subscriber, the method comprising the actions of:
    an SLS platform provisioning a telecommunications device ("TD") for receiving a particular service by:
        selecting the particular service to be rendered and selecting a relationship number to be associated with the particular service;
        wherein the TD is provisioned for the SLS and has at least one SLS phone number assigned to it including a particular SLS phone number and has a primary number from a carrier, associating the relationship number and the particular service with the particular SLS phone number and the primary number and creating a database entry for the association;
    establishing a communication path between the SLS platform and the TD;
    communicating the reserved relationship number to the TD;
    upon receipt of the reserved relationship number, the TD storing the reserved relationship number in memory;
    an SLS platform processing a service request by:
    receiving a call setup request from the TD, the call setup request being initiated by dialing the reserved relationship number using the TD, wherein the reserved relationship number consists only of a valid network terminable number that is recognized by the telephone network as being a number to be processed by the SLS platform and, wherein the reserved relationship number does not include any other information or any prefix or suffix, wherein the call initiation request is transmitted without the inclusion of a calling line identification of the originating TD;
    identifying the particular service, the primary number, and the particular SLS phone number associated with the relationship number;
    identifying one or more actions associated with the particular service; and
    performing the one or more actions on behalf of the TD and associating the service with the particular SLS phone number.

* * * * *